US012413700B2

(12) United States Patent
Hirabayashi et al.

(10) Patent No.: US 12,413,700 B2
(45) Date of Patent: Sep. 9, 2025

(54) IMAGE DISPLAY APPARATUS AND IMAGE DISPLAY SYSTEM

(71) Applicant: MAXELL, LTD., Kyoto (JP)

(72) Inventors: Tomonori Hirabayashi, Kyoto (JP); Mayumi Nakade, Kyoto (JP); Osamu Kawamae, Kyoto (JP); Hiroshi Nakamori, Kyoto (JP); Masuo Oku, Kyoto (JP)

(73) Assignee: MAXELL, LTD., Kyoto (JP)

( * ) Notice: Subject to any disclaimer, the term of this patent is extended or adjusted under 35 U.S.C. 154(b) by 0 days.

(21) Appl. No.: 18/290,018

(22) PCT Filed: May 13, 2021

(86) PCT No.: PCT/JP2021/018292
§ 371 (c)(1),
(2) Date: Nov. 9, 2023

(87) PCT Pub. No.: WO2022/239206
PCT Pub. Date: Nov. 17, 2022

(65) Prior Publication Data
US 2025/0227217 A1   Jul. 10, 2025

(51) Int. Cl.
*H04N 13/133* (2018.01)
*H04N 13/128* (2018.01)
(Continued)

(52) U.S. Cl.
CPC ......... *H04N 13/344* (2018.05); *H04N 13/128* (2018.05); *H04N 13/133* (2018.05);
(Continued)

(58) Field of Classification Search
CPC .. H04N 13/344; H04N 13/128; H04N 13/133; H04N 13/366; H04N 13/296; H04N 13/398; H04N 13/271; G06V 20/20
See application file for complete search history.

(56) References Cited

U.S. PATENT DOCUMENTS

2020/0255030 A1 * 8/2020 Yamamoto ............. G08G 1/166
2022/0044482 A1   2/2022 Kawamae et al.

FOREIGN PATENT DOCUMENTS

JP   2001155153 A * 6/2001
JP   2018147151 A * 9/2018
(Continued)

OTHER PUBLICATIONS

International Search Report of PCT/JP2021/018292 dated Aug. 3, 2021.

*Primary Examiner* — Douglas Wilson
(74) *Attorney, Agent, or Firm* — Mattingly & Malur, PC

(57) ABSTRACT

An image display apparatus includes a camera, a distance measurement sensor, an illuminance sensor, a brightness/darkness determinator, an image generator, an image storage, an image retriever, a visual image decider, and a display. The camera captures an image of a real object in front of a user to obtain a camera image. The image generator generates a distance image which corresponds to the camera image and represents a distance to each position of the real object based on data of the distance measurement sensor. The brightness/darkness determinator determines whether a place in which the user is present is a bright place or a dark place based on data of the illuminance sensor. The image storage stores the camera image and the distance image obtained in the bright place as a set.

16 Claims, 24 Drawing Sheets

(51) Int. Cl.
*H04N 13/271* (2018.01)
*H04N 13/296* (2018.01)
*H04N 13/344* (2018.01)
*H04N 13/366* (2018.01)
*H04N 13/398* (2018.01)
*G06V 20/20* (2022.01)

(52) U.S. Cl.
CPC ........... *H04N 13/366* (2018.05); *G06V 20/20* (2022.01); *H04N 13/271* (2018.05); *H04N 13/296* (2018.05); *H04N 13/398* (2018.05)

(56) References Cited

FOREIGN PATENT DOCUMENTS

| | | | |
|---|---|---|---|
| WO | WO-2016171190 A1 * | 10/2016 | ............. G02B 23/12 |
| WO | 2019/082926 A1 | 5/2019 | |
| WO | 2020/115784 A1 | 6/2020 | |

* cited by examiner

FIG. 6
BRIGHT PLACE
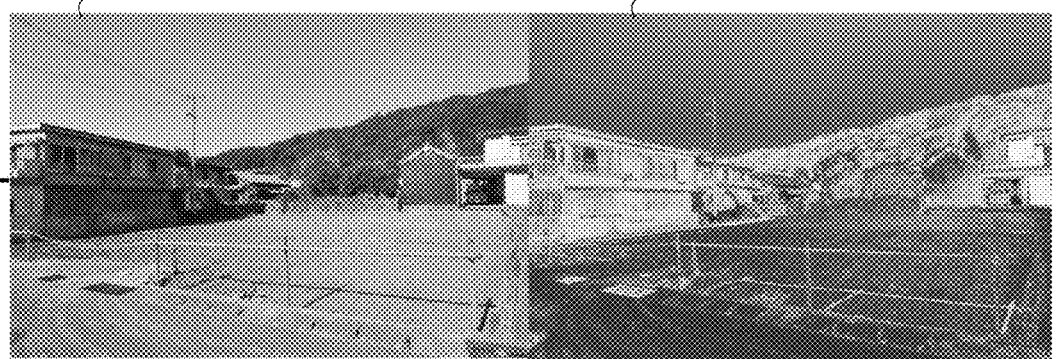
80A BRIGHT PLACE CAMERA IMAGE  81A BRIGHT PLACE DISTANCE IMAGE
 
DISTANT (BLUE)   CLOSE (RED)
DARK PLACE
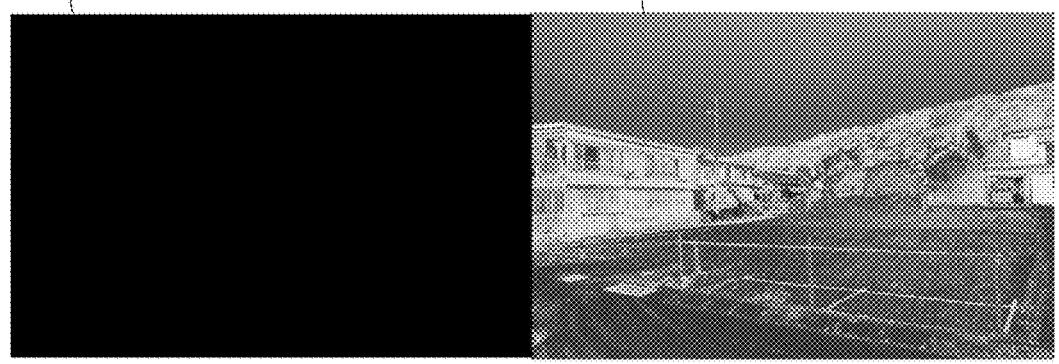
82B DARK PLACE CAMERA IMAGE  83B DARK PLACE DISTANCE IMAGE
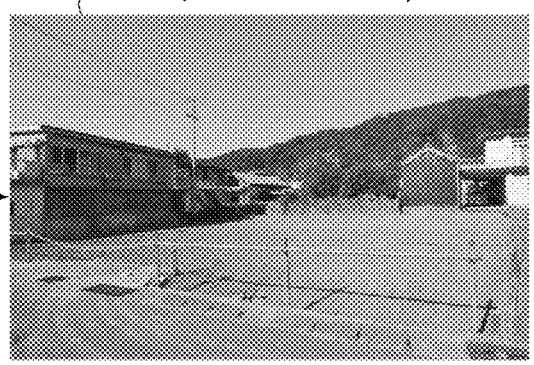
84B VISUAL IMAGE (DISPLAY IMAGE)

FIG. 9

| | GROUP ID | 550e8400-e29b-41d4-a716-446655440000 | |
|---|---|---|---|
| T12a | Site | Warehouse aaa | |
| T13a | GPS | 41° 24'12.2"N 2° 10'26.5"E. | Direction |
| T14a | Time | 2020-09-30T15:37:37+09:00 | H+145° V+5° |
| T15a | CAMERA IMAGE | aaa001camera.pictdata | |
| | DISTANCE IMAGE | aaa001distance.pictdata | |
| T13b | Time | 2020-09-30T15:40:12+09:00 | H+140° V-5° |
| T14b | CAMERA IMAGE | aaa002camera.pictdata | |
| T15b | DISTANCE IMAGE | aaa002distance.pictdata | |
| | Time | 2020-10-03T15:41:48+09:00 | H+20° V+10° |
| | CAMERA IMAGE | aaa003camera.pictdata | |
| | DISTANCE IMAGE | aaa003distance.pictdata | |
| | ⋮ | ⋮ | |
| T12b | Site | Building abc | |
| | GPS | 41° 20'22.2"N 4° 18'13.7"E. | Direction |
| | Time | 2020-10-02T10:21:14+09:00 | H+15° V+10° |
| | CAMERA IMAGE | abc001camera.pictdata | |
| | DISTANCE IMAGE | abc001distance.pictdata | |
| | Time | 2020-10-02T10:30:10+09:00 | H+75° V10° |
| | CAMERA IMAGE | abc002camera.pictdata | |
| | DISTANCE IMAGE | abc002distance.pictdata | |
| | Time | 2020-10-02T10:41:25+09:00 | H+95° V-5° |
| | CAMERA IMAGE | abc003camera.pictdata | |
| | DISTANCE IMAGE | abc003distance.pictdata | |
| | ⋮ | ⋮ | ⋮ |
| | ⋮ | ⋮ | ⋮ |

FIG. 12
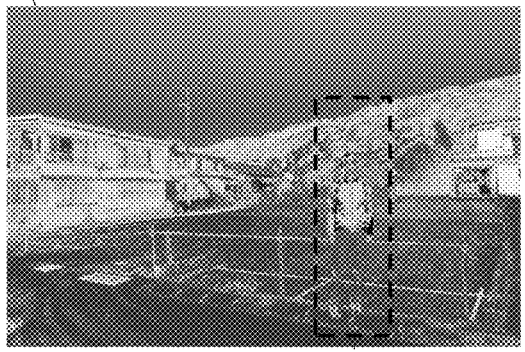
83E (AT CURRENT TIME)
DARK PLACE DISTANCE IMAGE
87 DIFFERENCE REGION
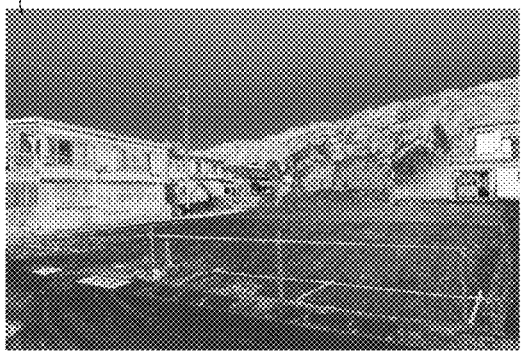
81B (PAST)
BRIGHT PLACE DISTANCE IMAGE
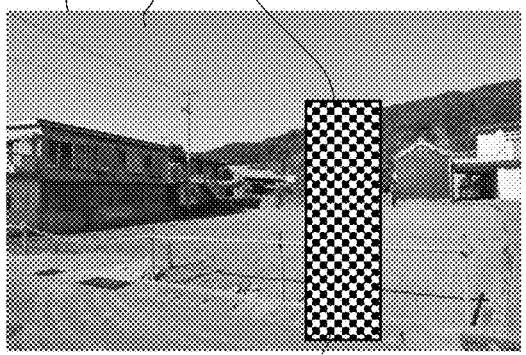
84E 80B  88A MASK
VISUAL IMAGE
87C CORRESPONDING REGION OF DIFFERENCE REGION
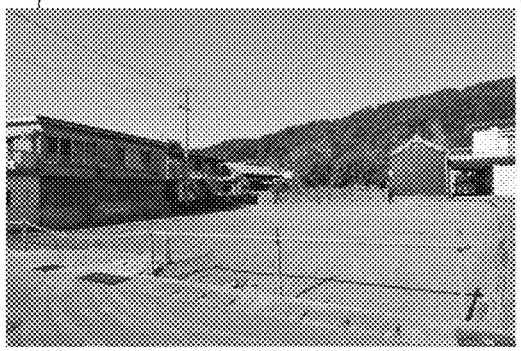
80B (PAST)
BRIGHT PLACE CAMERA IMAGE
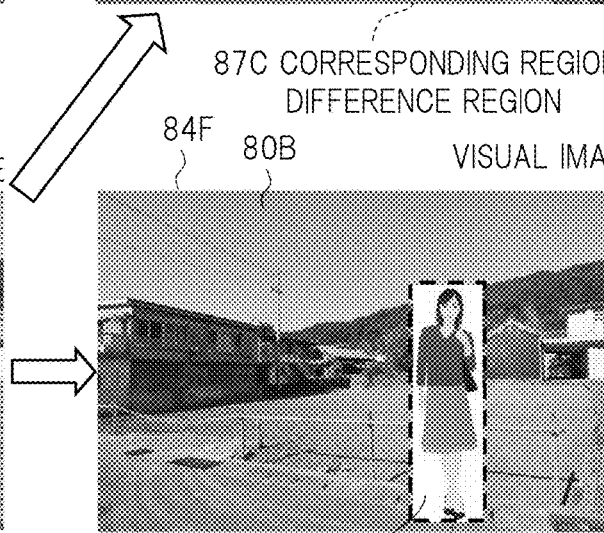
84F 80B
VISUAL IMAGE
88B AR OBJECT
87C CORRESPONDING REGION OF DIFFERENCE REGION (a) PARALLEL MOVEMENT (b) SCALING (c) USE PLURALITY OF DISTANCE IMAGES 1d

FIG. 22

"DARKNESS IS DETECTED.
DO YOU WANT TO SWITCH DISPLAY
SCREEN TO BRIGHT MODE?"

YES   NO

NO — IF NO, DISTANCE IMAGE IS DISPLAYED

YES — IF YES, PLEASE SELECT FROM FOLLOWING

- DAYTIME IMAGE
- PARTIAL IMAGE INTERPOLATION
- ARRANGED IMAGE

IMAGE DISPLAY APPARATUS AND IMAGE DISPLAY SYSTEM

TECHNICAL FIELD

The present invention relates to an image display apparatus and an image display system configured to support visual recognition in a dark place.

BACKGROUND ART

The augmented reality (AR) technology in which augmented reality objects generated by computer graphics (CG) are placed on a real space or a background image has been used for contents such as games or maintenance works. Users sense the augmented reality by watching content images synthesized on a display surface with a head mounted display (hereinafter, referred to also as an HMD), a portable information terminal, or the like.

Patent Document 1 discloses an HMD including a camera configured to capture an image of a background and a distance measurement device configured to measure a distance to a real object in the background. Furthermore, it discloses a technology of executing processing of extracting a real object from the image obtained by the camera and placing an AR object in association with the real object.

Patent Document 2 discloses an example of a distance measurement sensor. Patent Document 2 discloses a distance measurement sensor (LiDAR: Light Detection and Ranging) configured to obtain data representing a distance to an object in the front direction by scanning laser light and measuring an arrival time or a phase difference of reflected light of the laser light in the field of automatic driving of a vehicle.

RELATED ART DOCUMENTS

Patent Documents

Patent Document 1: International Publication WO2020/115784
Patent Document 2: International Publication WO2019/082926

SUMMARY OF THE INVENTION

Problems to be Solved by the Invention

However, in the technology described in Patent Document 1, usage in a dark place is not taken into consideration. For example, in a dark place in which camera imaging does not work well such as a place in which light is turned off due to a power failure or the like, a construction site or a maintenance site at night in which illumination light cannot be used due to consideration for a surrounding environment, or the interior of a building in which illumination light is not turned on, visual recognition in front of a user is poor, and as such it is difficult to use the technology.

Under such circumstances, it is desired to improve visibility in front of the user in a dark place.

Means for Solving the Problems

An outline of a representative embodiment of the invention disclosed in the present application will be briefly described as follows.

An image display apparatus according to a representative embodiment of the present invention is an image display apparatus configured to display a visual image to be visually recognized by a user, and the image display apparatus includes: a camera configured to capture an image in front of the user to obtain a camera image; a distance measurement sensor configured to obtain data representing a distance from the user to each position in a real object included in a visual field region of the camera; an illuminance sensor configured to obtain data representing brightness of a place in which the user is present; a generator configured to generate a distance image which corresponds to the visual field region and in which each pixel represents a distance to each of the positions based on the data obtained by the distance measurement sensor; a determinator configured to determine whether the place in which the user is present is a bright place or a dark place based on the data obtained by the illuminance sensor; a storage configured to store the camera image obtained by the camera and the distance image obtained by the generator as an image set including a bright place camera image and a bright place distance image when the determinator determines that the place in which the user is present is the bright place; a recognizer configured to recognize the distance image obtained by the generator as a dark place distance image when the determinator determines that the place in which the user is present is the dark place; a retriever configured to specify a bright place distance image corresponding to the recognized dark place distance image by comparing the bright place distance image stored in the storage with the dark place distance image recognized by the recognizer; a decider configured to decide the visual image to be visually recognized by the user based on the bright place camera image included in the same image set as the bright place distance image specified by the retriever; and a display configured to display the visual image.

Effects of the Invention

An effect obtained by a representative embodiment in the invention disclosed in the present application will be briefly described as follows.

According to the representative embodiment of the present invention, it is possible to improve visibility in front of a user in a dark place.

BRIEF DESCRIPTIONS OF THE DRAWINGS

FIG. 1 is an external view of an HMD according to a first embodiment.
FIG. 2 is a block diagram illustrating a hardware configuration of the HMD according to the first embodiment.
FIG. 3 is a functional block diagram illustrating a functional configuration of the HMD according to the first embodiment.
FIG. 4 is a flowchart of dark place guidance program processing by the HMD according to the first embodiment.
FIG. 5 is a flowchart of image set storage and management processing by the HMD according to the first embodiment.
FIG. 6 is a diagram illustrating an example of an image obtained by the HMD according to the first embodiment.
FIG. 7A is a diagram illustrating a first configuration example of an HMD system according to a second embodiment.
FIG. 7B is a diagram illustrating a second configuration example of the HMD system according to the second embodiment.
FIG. 8 is a block diagram illustrating a hardware configuration of an image storage service server.

FIG. 9 is a diagram illustrating an example of a data configuration of an image set.

FIG. 12 is a diagram illustrating a first example of decision processing of the visual image by the HMD according to the third embodiment.

FIG. 22 is a diagram illustrating an example of a user interface screen in the HMD.

DETAILED DESCRIPTION OF PREFERRED EMBODIMENTS

Figure 1:
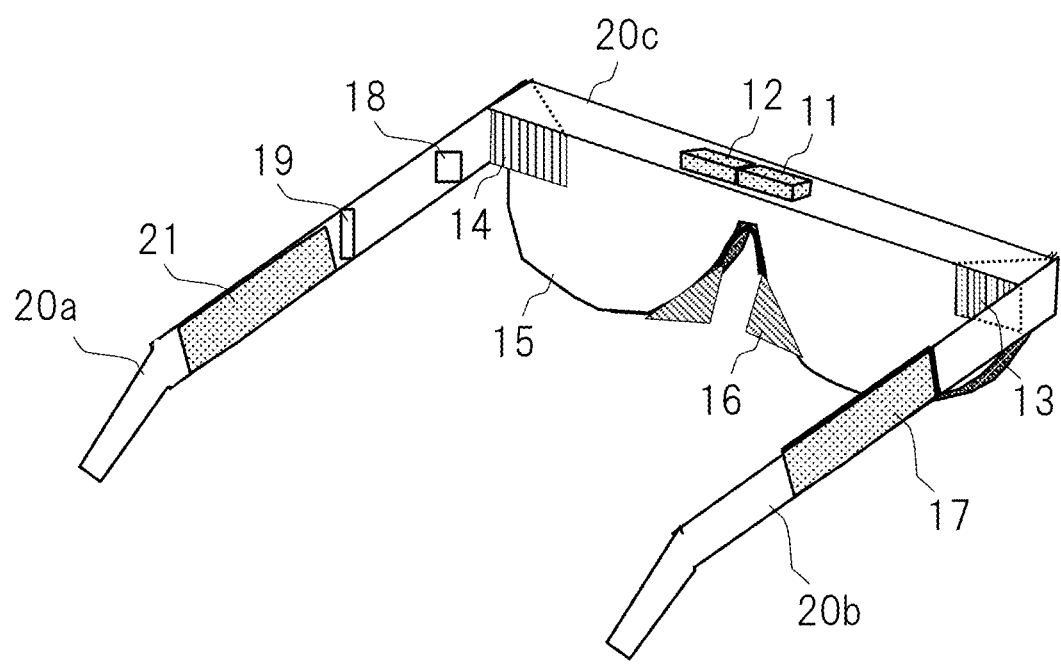

Hereinafter, embodiments of the present invention will be described. By providing such a technology as described in each of the following embodiments, it is possible to ensure safety in a dark place based on highly accurate distance measurement. This distance measurement technology contributes to "9. Build resilient infrastructure, promote inclusive and sustainable industrialization and foster innovation" and "11. Make cities and human settlements inclusive, safe, resilient and sustainable" of the sustainable development goals (SDGs) advocated by the United Nations.

Note that each embodiment described below is an example for realizing the present invention, and does not limit the technical scope of the present invention.

Additionally, in the following embodiments, components having the same function are denoted by the same reference characters, and the repetitive description thereof will be omitted unless particularly necessary.

In addition, in the following description of each embodiment, expressions such as "matching of images" or "same images" are included, but matching or being same here does not mean 100% exact matching or exact sameness. Here, the term "matching each other" or "being same" allows deviations in a linear direction, a rotation direction, and an enlargement/reduction direction of an image, a difference in color, a difference in density (brightness/darkness), and the like within a range not causing a practical problem.

Furthermore, in the following description of each embodiment, "a bright place distance image corresponding to a dark place distance image" or "another bright place distance image corresponding to a bright place distance image" means an image in which images substantially match each other except for some obvious difference regions. Here, the term "substantially match each other" allows deviations in a linear direction, a rotation direction, and an enlargement/reduction direction of an image, a difference in color, a difference in density (brightness/darkness), and the like within a range not causing a practical problem. For example, in a case where a matching degree or a similarity degree of images is equal to or greater than a certain threshold or exceeds the threshold, it is determined that the images match each other.

First Embodiment

An HMD according to a first embodiment of the present invention will be described.

Outline of First Embodiment

In a bright place, the HMD according to the first embodiment obtains a bright place camera image by a camera and a bright place distance image corresponding to the camera image and based on an output of a distance measurement sensor, and stores and accumulates these images as sets. On the other hand, in a dark place, the HMD obtains a dark place distance image based on the output of the distance measurement sensor, and retrieves and specifies a bright place distance image corresponding to (substantially matching) the dark place distance image. Then, the HMD decides and displays a visual image to be visually recognized by a user based on the bright place camera image included in the same set as the bright place distance image. As a result, in the dark place, the user can visually recognize the image in the bright place of the same place obtained in the past, and the visibility of the user can be improved.

<Hardware Configuration of HMD>

FIG. 1 is an external view of the HMD according to the first embodiment. As illustrated in FIG. 1, an HMD 1 according to the present embodiment includes a camera 11, a distance measurement sensor 12, a right-eye projector 13, a left-eye projector 14, an image screen (image display surface) 15, a nose pad 16, a controller 17, a microphone 18, a speaker 19, and frame housings 20a to 20c. A user wears the HMD 1 on his/her face with the frame housings 20a and 20b and the nose pad 16.

The right-eye projector 13, the left-eye projector 14, and the image screen 15 constitute a display device of the HMD 1. Note that the right-eye projector 13 and the left-eye projector 14 are hereinafter referred to also as projectors 13 and 14.

In the present embodiment, the image screen 15 is a semi-transmissive screen that allows light from the front of the user to be transmitted therethrough. However, as will be described later, the image screen 15 may be a non-transmissive display that does not allow light to be transmitted therethrough.

In the semi-transmissive screen, the user visually recognizes a situation in front through the semi-transmissive screen, but in the non-transmissive display, the user confirms the situation in front by watching a camera image obtained by capturing an image of the front on a display in the non-transmissive HMD.

The camera 11 is mounted so as to capture an image of a real space in front of the user. The camera 11 is a so-called digital camera, and captures an image of its own visual field region to obtain image data corresponding to the visual field region. In the present embodiment, the image represented by the image data is referred to as a camera image. The camera 11 repeats imaging at a predetermined timing under the control of the controller 17. Note that this imaging may be performed manually or automatically. In the case of automatic imaging, for example, imaging may be performed at a constant frame rate, and the frame rate may be appropriately adjusted according to the processing speed and the memory capacity of the controller 17. The frame rate may be, for example, about 1 to 30 frames per second (fps).

The distance measurement sensor 12 measures a distance from the sensor itself to a real object corresponding to each position in the visual field region of the camera 11, and obtains distance data representing the distance. Note that, when the user wears the HMD 1, the distance measurement sensor 12 is substantially equivalent to obtaining distance data representing the distance from the user to the real object corresponding to each of the above positions. The distance measurement sensor 12 can measure a distance even in a dark place, and for example, is configured to emit infrared light and receive reflected light from a real object like the LiDAR described above.

The projectors 13 and 14 project a CG image, a camera image, or the like on the image screen 15, and superimpose the CG image, the camera image, or the like on a background that is visually recognized through the image screen 15. In the case of projecting the CG image, the projectors 13 and 14 project a left-eye image and a right-eye image generated in consideration of parallax on the image screen 15, respectively. In this way, it is possible to stereoscopically display the CG image as if it were at a predetermined distance in the real space.

The controller 17 takes in the image data obtained by the camera 11 and the distance data obtained by the distance measurement sensor 12, and supplies these pieces of data to an internal memory or a processor. In addition, the controller 17 incorporates a sensor group including a global positioning system (GPS) sensor, an illuminance sensor, an acceleration sensor, a gyro sensor, an orientation (magnetic) sensor, and the like. Furthermore, the controller 17 generates an image to be projected by the projectors 13 and 14, a sound to be output by the speaker 19, and the like. The controller 17, the camera 11, the distance measurement sensor 12, the microphone 18, and the speaker 19 are disposed in the frame housings 20a to 20c. These arrangement places illustrated in FIG. 1 are merely examples, and are not limited to these.

Figure 2:
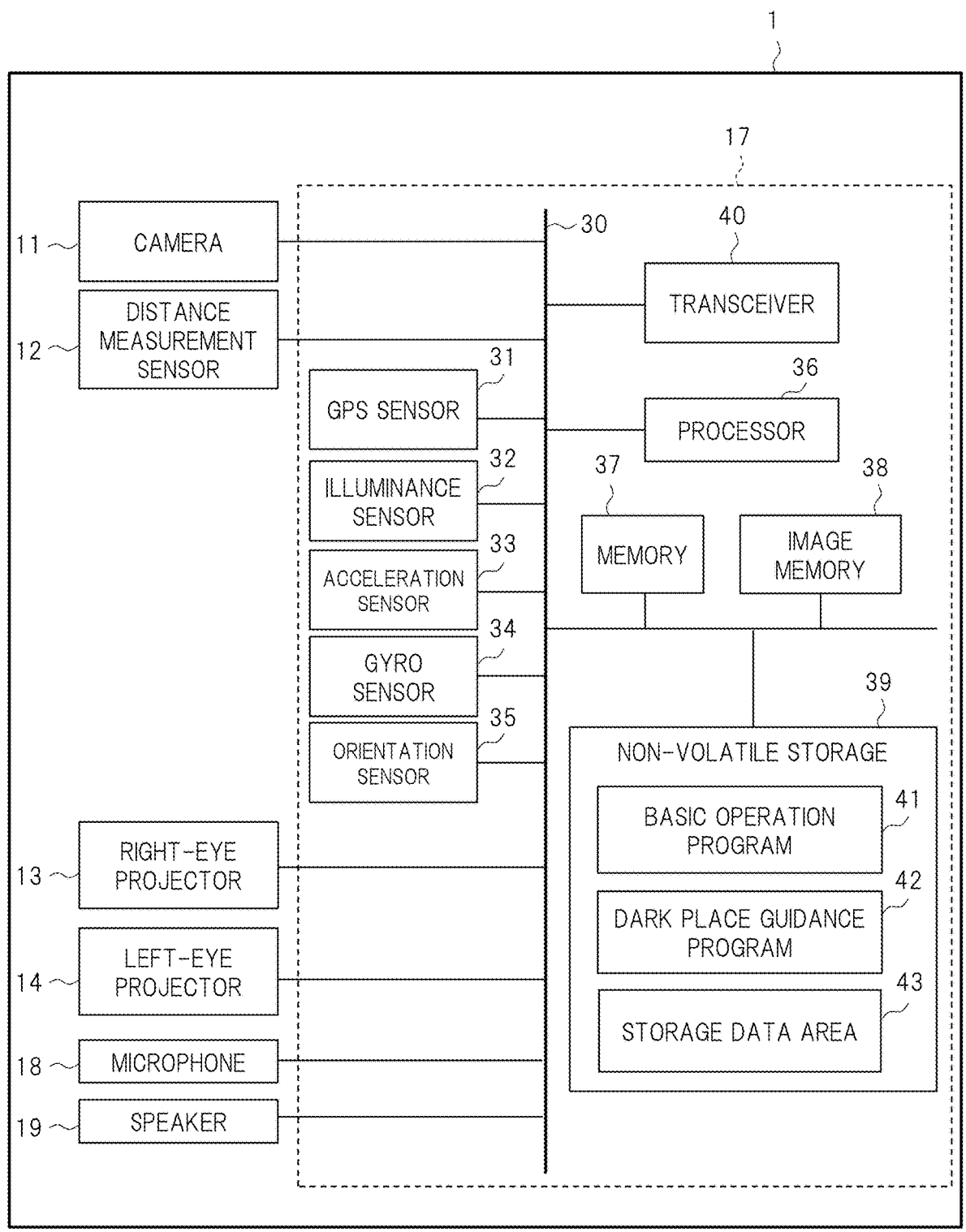

FIG. 2 is a block diagram illustrating a hardware configuration of the HMD according to the first embodiment. In FIG. 2, the same components as those illustrated in FIG. 1 are denoted by the same reference numbers. As illustrated in FIG. 2, the controller 17 of the HMD 1 according to the present embodiment internally includes an internal bus 30, a GPS sensor 31, an illuminance sensor 32, an acceleration sensor 33, a gyro sensor 34, an orientation sensor 35, a processor 36, a memory 37, an image memory 38, a non-volatile storage 39, and a transceiver 40. In addition, the blocks 31 to 40 are connected to each other via the internal bus 30 and operate in cooperation with each other.

The processor 36 is composed of, for example, a central processing unit (CPU) or a micro processing unit (MPU).

The memory 37 and the image memory 38 are composed of, for example, a random access memory (RAM) which is a semiconductor storage.

The non-volatile storage 39 is composed of a single or a plurality of non-volatile memory media. The non-volatile memory medium may be, for example, a programmable read only memory (ROM). The programmable ROM includes, for example, an electrically erasable and programmable ROM (EEPROM), a flash ROM (FROM), or the like. The non-volatile storage 39 stores a basic operation program 41 and a dark place guidance program 42 as processing programs. Further, a storage data area 43 is allocated to the non-volatile storage 39. Data and image data necessary for executing the processing program are stored in the storage data area 43.

The transceiver 40 includes a 4G (Generation) or 5G mobile communicator, a wireless LAN communicator, and the like. The transceiver 40 selects appropriate processing from among the various types of communication processing as necessary, and connects the HMD 1 to the network.

The image data to be sent to the projectors 13 and 14 is stored in and read from the image memory 38.

Note that the processor 36 loads the basic operation program 41 and the dark place guidance program 42 stored in the non-volatile storage 39 and executes them in the memory 37, thereby controlling and managing the basic operation and implementing the dark place guidance function.

<Functional Block Configuration of HMD>

Figure 3:
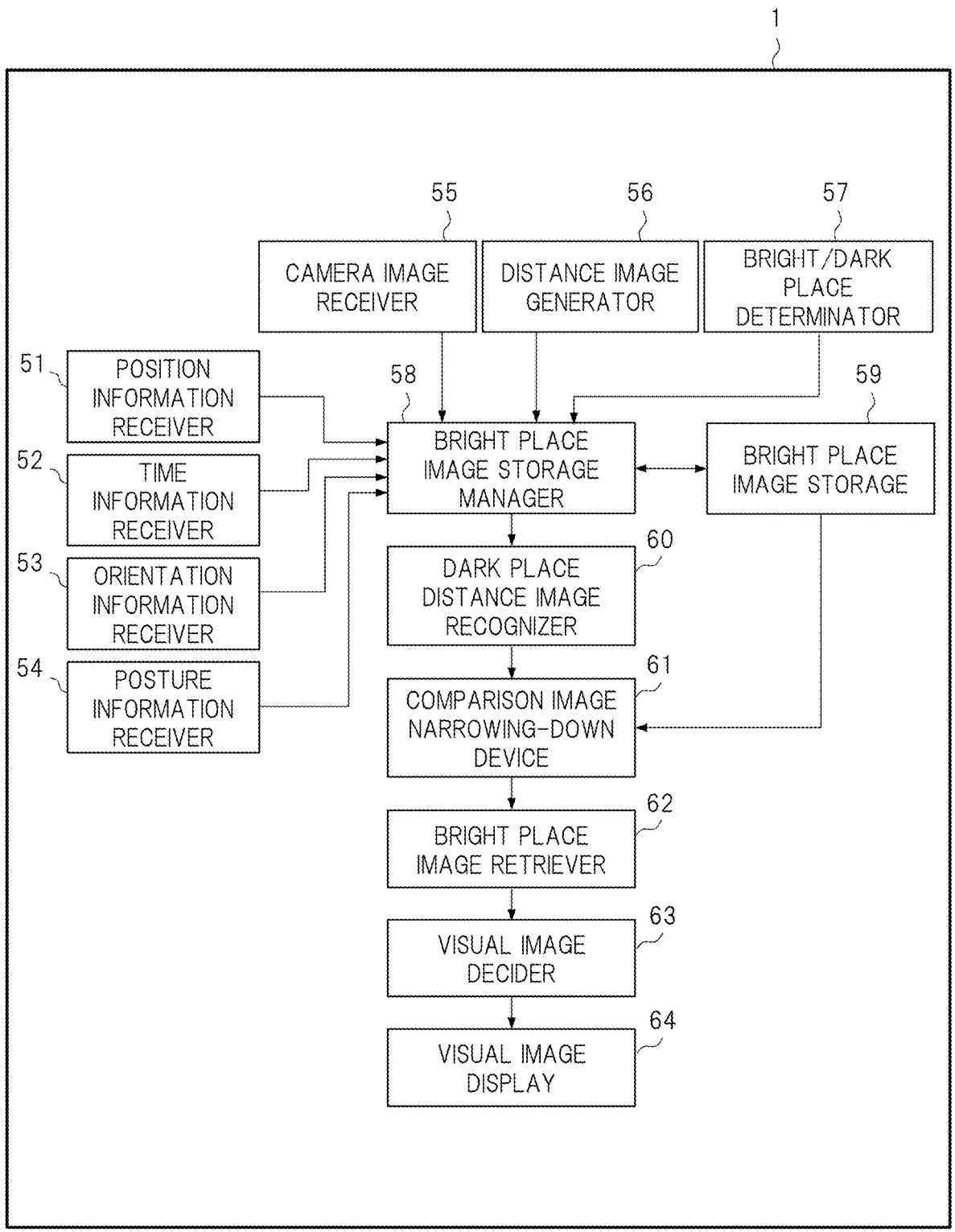

FIG. 3 is a functional block diagram illustrating a functional configuration of the HMD according to the first embodiment. Each functional block illustrated in FIG. 3 is implemented by allowing the processor 36 to load the dark place guidance program and execute it in the memory 37 in cooperation with various sensors and various devices included in the HMD 1.

As illustrated in FIG. 3, the HMD 1 according to the present embodiment includes, as functional blocks, a position information receiver 51, a time information receiver 52, an orientation information receiver 53, a posture information receiver 54, a camera image receiver 55, a distance image generator (generator) 56, a bright/dark place determinator (determinator) 57, a bright place image storage manager (storage) 58, a bright place image storage 59, a dark place distance image recognizer (recognizer) 60, a comparison image narrowing-down device 61, a bright place image retriever 62, a visual image decider 63, and a visual image display (display) 64.

The position information receiver 51 acquires coordinate data obtained by the GPS sensor 31, and generates position information indicating a place in which a user is present based on the coordinate data. The time information receiver 52 acquires clock data including date and time from an electronic clock included in the processor and generates time information indicating date and time when an image is obtained. The orientation information receiver 53 acquires orientation data obtained by the orientation sensor 35, and generates orientation information indicating the direction of the user's face in the horizontal direction, that is, the orientation based on the acquired orientation data. The posture information receiver 54 acquires data obtained by the acceleration sensor 33 and the gyro sensor 34, and generates posture information indicating the direction of the user's face in the vertical direction based on the data.

The camera image receiver 55 acquires image data obtained by the camera 11, and generates a camera image by performing image processing such as noise removal, interpolation, and size adjustment on the data as necessary. The camera image receiver 55 continuously and repeatedly acquires the image data at time intervals, and generates camera images in time series.

The distance image generator 56 acquires distance data obtained by the distance measurement sensor 12, and generates a distance image based on the data. The distance image is an image having a region corresponding to the visual field region of the camera image. Furthermore, the distance image is an image in which the distance from the distance measurement sensor 12 to the real object corresponding to each position in the visual field region is reflected in a pixel value (color or shade) of a pixel corresponding to each position. When the bright/dark place determinator 57 described later determines that a place in which the user is present is a bright place, the distance image generator 56 generates the distance image corresponding to the camera image for each generated camera image. When it is determined that the place in which the user is present is a dark place, the distance image generator 56 generates the distance image regardless of presence or absence of the camera image.

The bright/dark place determinator 57 acquires illuminance data obtained by the illuminance sensor 32, and determines whether the place in which the user is present is a bright place or a dark place based on the data. The bright/dark place determinator 57 determines the bright place or the dark place by, for example, threshold determination of the illuminance indicated by the illuminance data.

Note that the determination of the bright place and the dark place may be performed based on the brightness of the acquired camera image, or may be performed using both the illuminance data and the brightness of the camera image in combination.

In addition, the determination of the bright place and the dark place may be performed by supplementarily using position information and time information. For example, in a case where the illuminance indicated by the illuminance data is just around a middle place between the bright place and the dark place, the bright/dark place determinator 57 refers to the position information and the time information. Then, the place in which the user is present and the date and time are detected based on these pieces of information, and it is determined whether it is after the evening time set in advance for each place. If it is before the evening time, it is determined as the bright place, and if it is after the evening time, it is determined as the dark place.

The bright place image storage manager 58 stores the camera image and the distance image obtained when the bright/dark place determinator 57 determines that the place in which the user is present is the bright place, as an image set including the bright place camera image and the bright place distance image. When storing the image set, the bright place image storage manager 58 stores the position information, the time information, the orientation information, and the posture information when the image set is obtained, as metadata in association with the image set. A storage destination of the image set and the metadata is the bright place image storage 59 to be described later. Here, it has been described that the image set is stored when the bright place is determined, but a flag for discriminating between the bright place and the dark place may be added, and either the image set of the bright place or the dark place may be stored. In this case, if nothing is captured in the camera image in the dark place, only the time information may be stored without storing the camera image.

The bright place image storage 59 stores the image set and the metadata stored by the bright place image storage manager 58. That is, the image sets for each place in which the user is present and each direction (orientation) and posture of the user are sequentially stored and accumulated in the bright place image storage 59.

The dark place distance image recognizer 60 recognizes, as a dark place distance image, a distance image obtained when the bright/dark place determinator 57 determines that the place in which the user is present is a dark place.

When the dark place distance image is recognized, the comparison image narrowing-down device 61 narrows down the bright place distance images to be compared with the dark place distance images from among the bright place distance images stored in the bright place image storage 59. The bright place distance images are narrowed down using the associated metadata. That is, based on position information, the time information, the orientation information, and the posture information when the recognized dark place distance image is obtained, the bright place distance image in which the place in which the user is present, the date when the user is present, the direction of the user, and the posture of the user are approximate within a predetermined range is retrieved and narrowed down. In the present embodiment, narrowing down the bright place distance images is performed based on the position information, the time information, the orientation information, and the posture information, but narrowing may be performed by only the position information, by only the position information and the orientation information, or by only the position information, the orientation information, and the posture information. Alternatively, the narrowing down the bright place distance images itself by the comparison image narrowing-down device 61 may be omitted.

The bright place image retriever 62 sequentially reads the bright place distance image to be compared with the recognized dark place distance image, and compares the dark place distance image with the read bright place distance image. Then, based on a result of the comparison therebetween, the bright place distance image corresponding to the dark place distance image, that is, the bright place distance image matching the dark place distance image within an allowable range is retrieved and specified. The comparison between the dark place distance image and the bright place distance image is performed with the inclusion of parallel movement, rotation (inclination) movement, enlargement/reduction, pixel value adjustment, and the like of at least one distance image.

For the determination as to whether the distance images match each other within the allowable range, for example, it is possible to use a method of calculating a matching degree between the recognized dark place distance image and the read bright place distance image, determining that the distance images match each other when the matching degree is equal to or greater than a threshold, and determining that the images do not match each other when the matching degree is less than the threshold.

As a specific example, a difference between pixel value levels of corresponding pixels or pixel groups, for example, a difference between average values of pixel values is acquired for each position or region in the distance image, the magnitude of the difference is comprehensively evaluated to calculate the matching degree, and threshold determination is made based on the matching degree. The matching degree mentioned above may be, for example, a value obtained by multiplying a variance value or a deviation value with respect to a difference between pixel value levels at each position or each region by a negative coefficient, a reciprocal of the variance value or the deviation value, or the like.

Note that, in a case where it is recognized in the comparison between the distance images that there is a difference only in a partial region in the entire image region, it is regarded that the images match each other within the allowable range. That is, the matching determination is performed except for a difference region and the like described later.

In addition, for example, artificial intelligence may be used to determine whether the distance images match each other within the allowable range. As for this artificial intelligence, the artificial intelligence that has learned about matching of images representing objects that can exist in the real space may be used.

The visual image decider 63 decides a visual image to be visually recognized by the user based on the result of comparison between the distance images by the bright place image retriever 62. When the bright place distance image substantially matching the dark place distance image is specified, the visual image decider 63 decides the visual image based on the bright place camera image included in the same image set as the bright place distance image. In a case where a number of matching distance images are specified, the latest image may be selected, the brightest image may be selected, or the user may select a certain image. On the other hand, in a case where the bright place distance image substantially matching the dark place distance image is not specified, the visual image is decided based on the dark place distance image. The visual image may be the bright place camera image itself or the dark place distance image itself, or may be obtained by performing image processing such as synthesizing based on the bright place camera image or the dark place distance image depending on cases.

The visual image display 64 projects and displays the image on the image screen 15 by the projectors 13 and 14 in order to allow the user to visually recognize the decided visual image. Here, in a case where the user is moving, it may be difficult to display the bright place camera image of the same position in a moving image without delay while detecting the position. In such a case, a still image may be displayed in accordance with the moving position of the user.

<Flow of Dark Place Guidance Program Processing>

Dark place guidance program processing will be described below.

Figure 4:
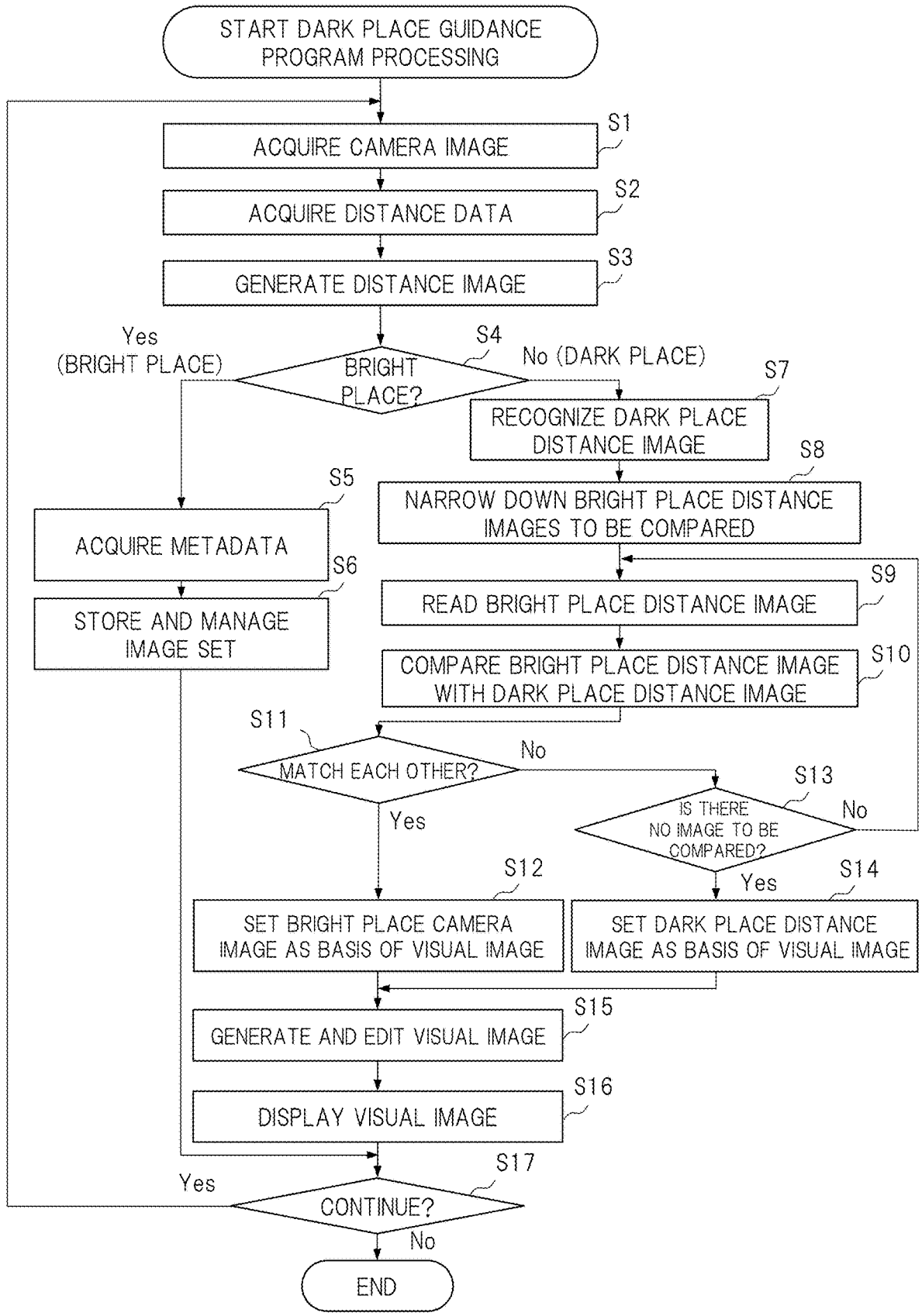

FIG. 4 is a flowchart of dark place guidance program processing by the HMD according to the first embodiment.

In step S1, processing of acquiring a camera image is performed. Specifically, the camera image receiver 55 acquires image data obtained by the camera 11. The camera image may be acquired in synchronization with a camera imaging, or an image obtained by performing image capturing at any timing may be acquired while continuously capturing an image. In a case where image capturing is continuously performed, for example, the image capturing is performed at a frame rate of about 10 to 60 frames per second (fps).

In step S2, processing of acquiring distance data is performed. Specifically, the distance image generator 56 acquires the distance data representing a distance from a distance measurement sensor to a real object included in a visual field region of the camera 11.

In step S3, processing of generating a distance image is performed. Specifically, the distance image generator 56 generates the distance image corresponding to the visual field region of the camera 11 based on the acquired distance data.

In step S4, processing of determining whether a place is a bright place or a dark place is performed. Specifically, the bright/dark place determinator 57 acquires illuminance data from the illuminance sensor 32, and determines whether a place in which the user is present is the bright place or the dark place based on the illuminance data. Note that, as described above, this determination may be performed based on the brightness of the acquired camera image, or may be performed by supplementarily using the position information, the time information, and the like. In this determination, when it is determined that the place is the bright place (S4, Yes), the flow proceeds to step S5. On the other hand, when it is determined that the place is the dark place (S4, No), the flow proceeds to step S7.

In step S5, processing of acquiring metadata is performed. Specifically, the bright place image storage manager 58 acquires time information, position information, orientation information, and posture information as the metadata to be associated with an image set.

In step S6, processing of storing, updating, and managing the image set is performed. Specifically, the bright place image storage manager 58 sets the obtained camera image and distance image as a bright place camera image and a bright place distance image. Then, the image set including these images and the acquired metadata are stored in association with each other in the bright place image storage 59. Thereafter, the flow proceeds to step S17.

Note that, in a case where the bright place distance image corresponding to the bright place distance image to be stored has already been stored when the image set is stored, the image set may be overwritten. Alternatively, in a case where the acquired date and time is close, only recording date and time may be added without overwriting the image.

In addition, an image set whose acquired date and time is a certain period of time (first time) or more ago, that is, an old image set may be erased (deleted) from the bright place image storage 59. The certain period of time may be, for example, about one month to one year.

Note that details of the image set storage and management processing in step S6 will be described later again.

In step S7, processing of recognizing the dark place distance image is performed. Specifically, when receiving the determination indicating that the place in which the user is present is the dark place, the dark place distance image recognizer 60 recognizes the obtained distance image as the dark place distance image.

In step S8, processing of narrowing down the bright place distance images to be compared is performed. Specifically, the comparison image narrowing-down device 61 narrows down the bright place distance images to be compared with the recognized dark place distance images from among the past bright place distance images stored in the bright place image storage 59. The bright place distance images are narrowed down using the associated metadata. That is, based on the position information when the recognized dark place distance image is obtained, the bright place distance images in which the place in which the user is present is matched or similar within a predetermined range are retrieved and narrowed. Note that not only the position information but also the orientation information or the posture information may be used to retrieve and narrow down the bright place distance images in which the orientation in which the user is facing, the posture of the user (the inclination of the face in the vertical direction), or both of them are matched or similar within the predetermined range.

In step S9, processing of reading the bright place distance image is performed. Specifically, the bright place image retriever 62 reads one bright place distance image from among the narrowed bright place distance images.

In step S10, processing of comparing the dark place distance image with the bright place distance image is performed. Specifically, the bright place image retriever 62 compares the recognized dark place distance image with the read bright place distance image, and calculates an evaluation value reflecting the matching degree between the distance images. Here, in a case where the distance image of the bright place is not stored and only the camera image is stored, the feature of the distance image of the dark place and the feature of the camera image of the bright place may be extracted and compared with each other.

In step S11, processing of determining whether the compared distance images have a correspondence relationship, that is, whether the distance images substantially match each other is performed. Specifically, the bright place image retriever 62 determines whether or not the recognized dark place distance image and the read bright place distance image substantially match each other by threshold determination based on the calculated evaluation value. In this determination, when it is determined that the distance images match each other (S11, Yes), the flow proceeds to step S12. On the other hand, when it is determined that the distance images do not match each other (S11, No), the flow proceeds to step S13.

In step S12, processing of setting the bright place camera image as the basis of the visual image is performed. Specifically, the visual image decider 63 sets the bright place camera image included in the same image set as the bright place distance image determined to be matched in step S11 as the basis of the visual image to be visually recognized by the user. Thereafter, the flow proceeds to step S15.

In step S13, processing of determining whether all the comparisons for the narrowed bright place distance images have been completed is performed. Specifically, the bright place image retriever 62 determines whether comparisons of all the narrowed bright place distance images are performed and there remains no bright place distance image to be compared next. When it is determined that all the comparisons have been completed (S13, Yes), the flow proceeds to step S14. On the other hand, when it is determined that all the comparisons have not been completed (S13, No), the flow returns to step S9, and the bright place distance image to be compared next is read.

In step S14, processing of setting the dark place distance image as the basis of the visual image is performed. Specifically, the visual image decider 63 sets the recognized dark place distance image as the basis of the visual image to be visually recognized by the user.

In step S15, processing of generating and editing the visual image is performed. Specifically, the visual image decider 63 generates and decides the visual image based on the bright place camera image or the dark place distance image set as the basis. At this time, if necessary, editing such as attaching a CG image or an AR object image to the image set as the basis or emphasizing a part of the image set as the basis is performed.

In step S16, processing of displaying the visual image is performed. Specifically, the visual image display 64 projects and displays the decided visual image on the image screen 15 so as to be visually recognized by the user.

In step S17, processing of determining whether to continue the dark place guidance program is performed. For example, in a case where the user has moved from a dark place to a bright place, in a case where the user has moved to an environment in which it seems unnecessary to execute the dark place guidance program, in a case where a command to stop or end the dark place guidance program is input by the user, or in a case where an internal processing error or a communication error occurs, it is determined that the program is not continued (S17, No), and the dark place guidance program ends. On the other hand, in a case where there is no particular reason for ending the program, it is determined that program is continued (S17, Yes), the flow returns to step S1, and the processing by the dark place guidance program is continued.

<Image Set Storage and Management Processing>

Here, the flow of the image set storage and management processing in step S6 described above will be described in detail.

Figure 5:
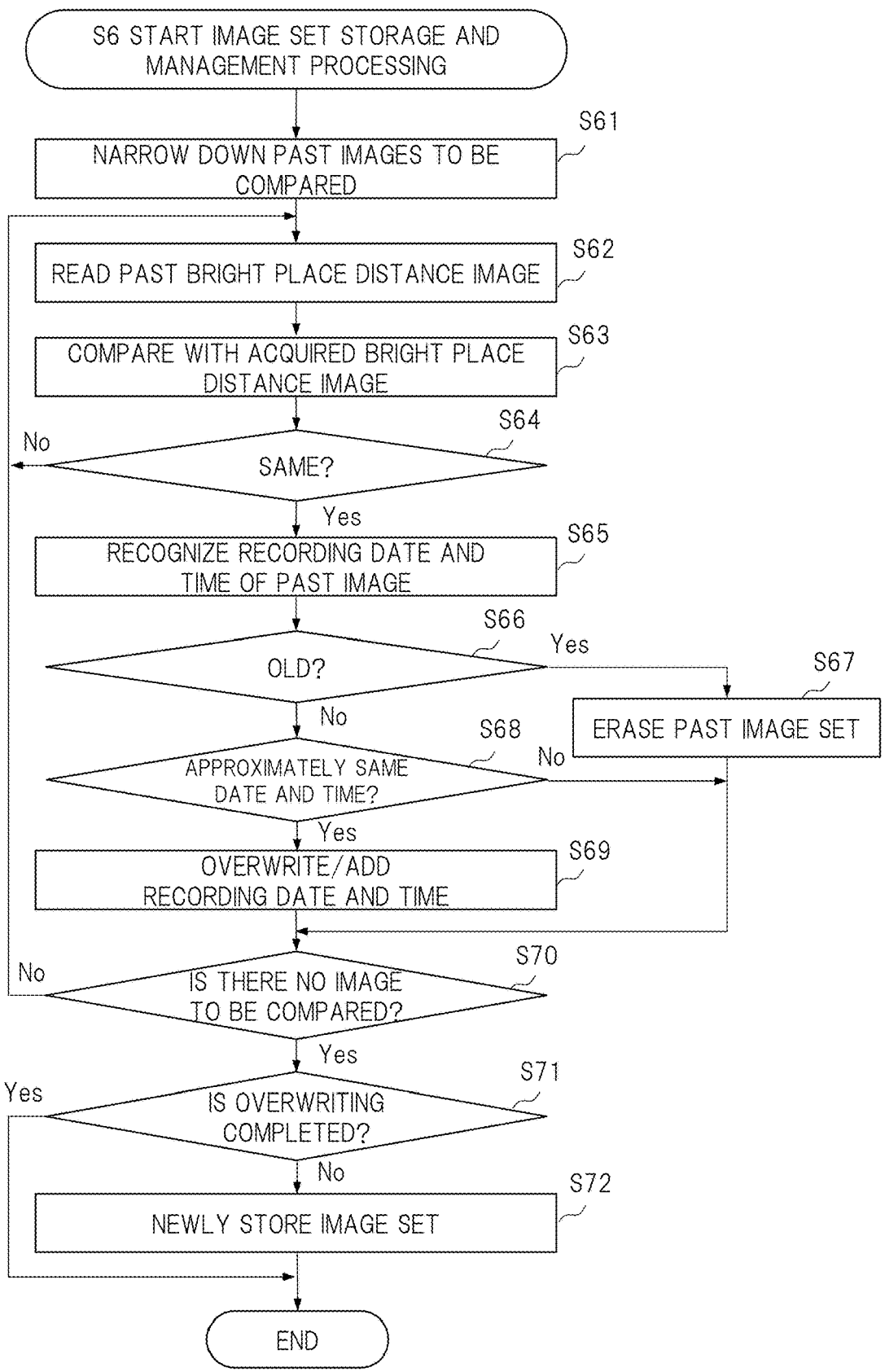

FIG. 5 is a flowchart of the image set storage and management processing by the HMD according e first embodiment.

In step S61, processing of narrowing down the past image sets to be compared is performed. Specifically, the bright place image storage manager 58 narrows down, as comparison targets, the bright place distance images in which the imaging place, the direction (orientation), and the posture of the user of the acquired image set at the current time are matched within the predetermined range, based on the metadata acquired at the current time from among the past bright place distance images stored in the bright place image storage 59. Note that this narrowing may be performed based on only the imaging place without considering the orientation and the posture at the time of imaging.

In step S62, processing of reading one past bright place distance image is performed. Specifically, the bright place image storage manager 58 reads one from among the past bright place distance images narrowed down in step S61. At this time, the past bright place distance image may be read in order of the place recognized by the position information included in the metadata closer to the place and the orientation at the current time. Accordingly, there is a possibility that necessary processing such as new storage of an image set, overwriting, addition of recording date and time, and erasure of an old image set, which will be described later, ends at a relatively early stage. As a result, even when the image set storage and management processing is interrupted for some reason, it is possible to reduce the risk of occurrence of adverse effects.

In step S63, processing of comparing the bright place distance image at the current time with the past bright place distance image is performed. Specifically, the bright place image storage manager 58 compares the acquired bright place distance image at the current time with the past bright place distance image read in step S62.

In step S64, processing of determining whether the bright place distance images to be compared are the same is performed. Specifically, the bright place image storage manager 58 determines whether the acquired bright place distance image at the current time and the past bright place distance image read in step S62 match each other within the allowable range, that is, are substantially the same. In a case where the distance images are completely different from each other or deviated by a predetermined level or more, it is determined that the distance images are not the same. In this determination, when it is determined that the distance images are the same (S64, Yes), the flow proceeds to step S65. On the other hand, in this determination, when it is determined that the distance images are not the same (S64, No), the flow returns to step S62, the bright place distance image to be compared next is read, and the processing is continued.

In step S65, processing of recognizing the recording date and time of the past bright place distance image is performed. Specifically, the bright place image storage manager 58 reads and recognizes the recording date and time included in the metadata of the past bright place distance image read in step S62.

In step S66, processing of determining whether the read past bright place distance image is old is performed.

Specifically, the bright place image storage manager 58 determines whether the recording date and time recognized in step S65 is earlier, that is, older than the current time by a certain period or more. In this determination, when it is determined that the recording date and time is older (S66, Yes), the flow proceeds to step S67. On the other hand, in this determination, when it is determined that the recording date and time is not older (S66, No), the flow proceeds to step S68.

In step S67, processing of erasing the past image set is performed. Specifically, the bright place image storage manager 58 erases the image set including the past bright place distance image read in step S62. Then, the flow proceeds to step S70.

In step S68, processing of determining whether the recognized recording date and time is substantially the same as the date and time at the current time is performed. Specifically, the bright place image storage manager 58 determines whether a time difference between the recording date and time recognized in step S65 and the date and time at the current time is within a relatively short time set in advance, that is, whether the recording date and time recognized in step S65 and the date and time at the current time are substantially the same date and time. The time set in advance can be, for example, about 1 hour to 1 day, but is not limited thereto. In this determination, when it is determined that the recording date and time recognized in step S65 and the date and time at the current time are substantially the same (S68, Yes), the flow proceeds to step S69. On the other hand, in this determination, when it is determined that the recording date and time recognized in step S65 and the date and time at the current time are not the same (S68, No), the flow proceeds to step S70.

In step S69, processing of overwriting or adding the recording date and time is performed. Specifically, the bright place image storage manager 58 overwrites a new image set including the acquired bright place distance image and bright place camera image with respect to the image set including the past bright place distance image read in step S62. Alternatively, with respect to the image set including the past bright place distance image read in step S62, only the recording date and time as the metadata is updated to the date and time at the current time. In this case, since there is no substantial difference in the image itself, there is no problem even if only the recording date and time is updated, and the processing can be simplified in this way.

However, in a case where the past image set including the read past bright place distance image is advantageous or is easy to use, it is preferable to update the recording date and time without performing overwriting. For example, in a case where the bright place distance image or the bright place camera image included in the past image set has a relatively higher resolution than that of an image at the current time, or in a case where the aspect ratio of the image in the past image set is well-balanced than that at the current time, the update of the recording date and time is selected. After step S69 is completed, the flow proceeds to step S70.

In step S70, processing of determining whether there is still the past bright place distance image to be compared is performed. Specifically, the bright place image storage manager 58 determines whether all the comparisons of the past bright place distance images narrowed down as comparison targets in step S61 have been completed and there remains no past bright place distance image to be compared. In this determination, when it is determined that there is no remaining past bright place distance image (S70, Yes), the flow proceeds to step S71. On the other hand, in this determination, when it is determined that there is the remaining past bright place distance image (S70, No), the flow returns to step S62, and the next past bright place distance image is read and the processing is continuously performed.

In step S71, processing of determining whether overwriting the image set is completed is performed. Specifically, the bright place image storage manager 58 determines whether the processing in step S69, that is, the overwriting of the image set acquired at the current time or the addition of the recording date and time has already been performed. In this determination, when it is determined that the overwriting and the like have already been performed (S71, Yes), the image set storage and management processing ends. On the other hand, when it is determined that the overwriting and the like have not been performed (S71, No), the flow proceeds to step S72.

In step S72, processing of newly storing the image set is performed. Specifically, the bright place image storage manager 58 newly stores the acquired image set in the bright place image storage 59 in association with the metadata obtained at the current time. Then, the image set storage and management processing ends.

According to such image set storage and management processing, a past image set substantially the same as the acquired image set is retrieved and specified. Then, with respect to the specified image set, the past image set is erased if it is old, the past image set is left if it is not old but has a recording date and time different by a certain period of time or more, and the past image set is overwritten or recording date and time is added or updated if it has substantially the same recording date and time. Furthermore, the acquired image set is newly stored if the recording date and time or the time zone is different or at least a part of the image is different by a certain level or more as a result of the comparison with the past image set. In this way, the necessary image set can be stored for a necessary period, so that an inexhaustible increase in the storage capacity of the image set can be suppressed, and the storage capacity can be appropriately maintained.

<Examples of Camera Image, Distance Image, and Visual Image>

FIG. 6 is a diagram illustrating an example of an image obtained by the HMD according to the first embodiment. FIG. 6 illustrates examples of camera images and distance images obtained in a bright place and a dark place, and a visual image. In FIG. 6, the upper part is the images in the bright place recorded in the past, and the middle part is the images in the dark place at the current time. In addition, the camera images are illustrated on the left side, and the distance images are illustrated on the right side. In general, the distance images are shown in different colors depending on the closeness of the distance, but are shown here in black and white (grayscale) in a pseudo manner.

In FIG. 6, 80A denotes a clearly captured bright place camera image, and 81A denotes a bright place distance image corresponding to the bright place camera image 80A. 82B denotes a dark place camera image obtained at the current time, which is unclear because the surroundings are dark. On the other hand, 83B is a dark place distance image corresponding to the dark place camera image 82B and acquired almost at the same time as the dark place camera image 82B, but is obtained with sharpness comparable to that of the bright place distance image 81A.

The user sees the front scenery through a translucent image screen of the HMD, and it is difficult in a dark place to confirm the situation in front as in the dark place camera image 82B. Therefore, as illustrated in the lower part of FIG. 6, the camera image in the bright place whose distance image matches is decided as a visual image 84B to be visually recognized by the user. Then, the visual image is displayed on the display surface of the HMD. As a result, the user can confirm the state on site in the dark place.

In addition, for example, by extracting the contour of an object from the dark place distance image of 83B and comparing it with the contour of an object extracted from the bright place distance image of 81A or the bright place camera image of 80A, these images can be confirmed as images of the visual field from the same position. Even in such a case, by displaying the camera image in the bright place on the HMD, the user can confirm the state on site in the dark place.

According to the first embodiment described above, by displaying the camera image in the bright place of the same visual field stored in the past, it is possible to support the user to visually recognize the front even in the dark place where it is difficult to visually recognize the front. For example, by providing a clear camera image obtained in a bright place instead of a camera image captured in a dark place, the user can confirm the presence of an object such as an obstacle and can work more safely even at a work site that is dark and poor in visibility.

Furthermore, in the first embodiment, when the image set is stored, the following processing is performed in a case where a corresponding image, that is, a substantially matching bright place distance image has already been stored. That is, in a case where the acquisition date and time of the already stored corresponding image is within a certain period from the acquisition date and time of the image to be stored and is relatively new, the corresponding image is not overwritten, and only the date and time of the corresponding image is added to the current date and time. In addition, in a case where the acquisition date and time of the corresponding image is earlier than the acquisition date and time of the image to be stored by a certain period or more and the corresponding image is older than the image to be stored, the corresponding image is erased. In this way, it is possible to simplify the processing to speed up the processing, reduce energy consumption, and efficiently use a storage area.

Furthermore, in the first embodiment, a place in which the current user is present is specified by GPS or the like, and the bright place distance image narrowed down based on the place is retrieved. As a result, the time for image retrieval can be shortened.

In addition, in the first embodiment, a semi-transmissive screen that allows light from the front of the user to be transmitted therethrough is used as an image screen which is an image display surface. As a result, the user can directly visually recognize the real object in front in a state of wearing the HMD, and can have a natural feeling as if wearing glasses.

Note that, in the first embodiment, matching determination is performed by comparing the dark place distance image with the bright place distance image in steps S10 and S11. However, there may be a case in which the bright place distance image is not recorded for some reason. In such a case, the matching determination may be performed by comparing the dark place distance image with the bright place camera image. For example, the matching determination may be performed by extracting the contour of an object from the dark place distance image, extracting the contour of an object from the bright place camera image, and comparing contours of both images. In this way, even in a case where there is no bright place distance image and the bright place camera image is stored, an image having high visibility can be provided to the user.

Furthermore, in the first embodiment, in a case where the place in which the user is present is limited and the number of bright place distance images to be compared is small, or in a case where the processing speed is high, the processing of narrowing down the bright place distance images to be compared may be omitted. In this way, the algorithm of the dark place guidance program can be simplified, and the development costs can be reduced.

Furthermore, in the first embodiment, in a case where the user is present indoors or the like and position information by GPS cannot be obtained, and the metadata of the image set includes position information and orientation data by a network access point, ultra wide band (UWB), or the like, these information and data may be used. That is, the bright place distance image having, as the metadata, substantially the same position information and orientation information as the position information obtained by the access point or the like and the orientation information detected by the orientation sensor in the place in which the user is present may be preferentially retrieved. In this way, even when the position information by the GPS cannot be used, the retrieval time for the bright place distance image can be shortened.

In addition, in the first embodiment, in a case where the initial position of the user can be determined by the GPS or the access point of the wireless communication, the place in which the user is present after the movement of the user may be specified using a method such as pedestrian dead reckoning (PDR), and the bright place distance image according to the line-of-sight direction from the position may be retrieved. In this way, even when the user moves from outdoors to indoors, the dark place guidance program can be continuously executed.

Furthermore, in the first embodiment, the specified bright place camera image is directly used as the visual image, but an image obtained by changing the brightness or color of the specified bright place camera image by image processing may be used as the visual image. For example, the color of the specified bright place camera image may be converted into black and white or sepia, or may be arranged in a gorgeously brilliant color used in CG or animation. A virtual reality space corresponding to the place in which the user is present, the orientation in which the user is facing, and the posture of the user may be displayed, and a CG image artificially created based on the specified bright place camera image may be superimposed and displayed on the virtual reality space.

Second Embodiment

A second embodiment of the present invention will be described.

Outline of Second Embodiment

The second embodiment is an HMD system in which an HMD and a server are connected to each other via a network. In the present embodiment, an image storage service including a dark place guidance function is provided to a user by cooperation between the HMD and the server.
<Configuration of HMD System>

A configuration of the HMD system according to the second embodiment will be described.

Figure 7A:
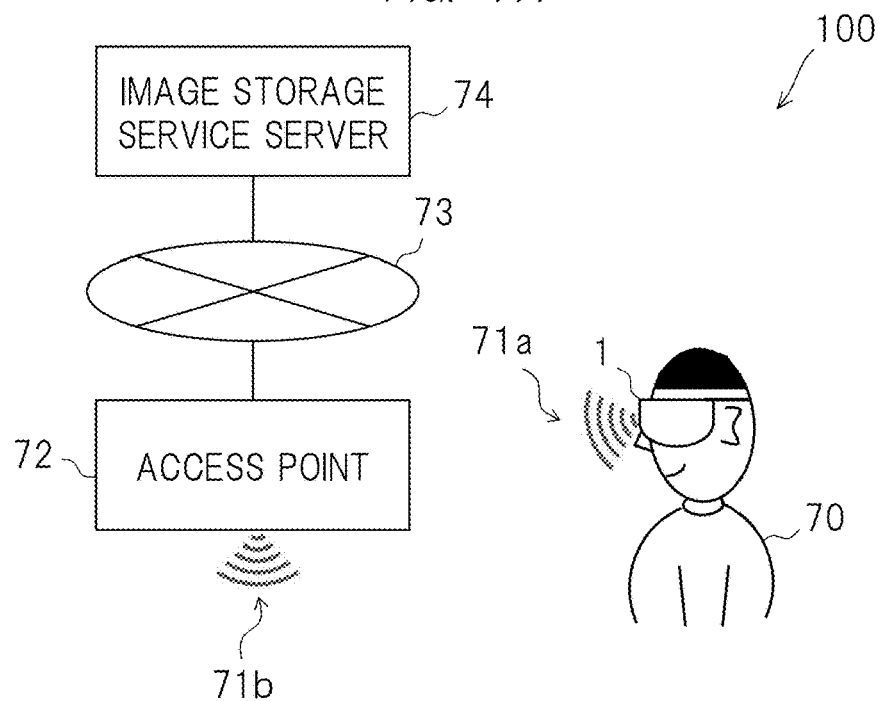

FIG. 7A is a diagram illustrating a first configuration example of the HMD system according to the second embodiment. FIG. 7A illustrates a configuration of an HMD system 100 in which a single HMD and a server are connected to each other via a network.

As illustrated in FIG. 7A, the HMD system 100 according to the present embodiment includes an HMD 1, a user 70, wireless communication signals 71*a* and 71*b* by electromagnetic waves or the like, an access point 72, a network 73, and an image storage service server (server) 74. The network 73 may be, for example, a wide area communication network, and specifically, the Internet, Ethernet, an industrial communication network, or the like.
<Configuration of Image Storage Service Server>

Figure 8:
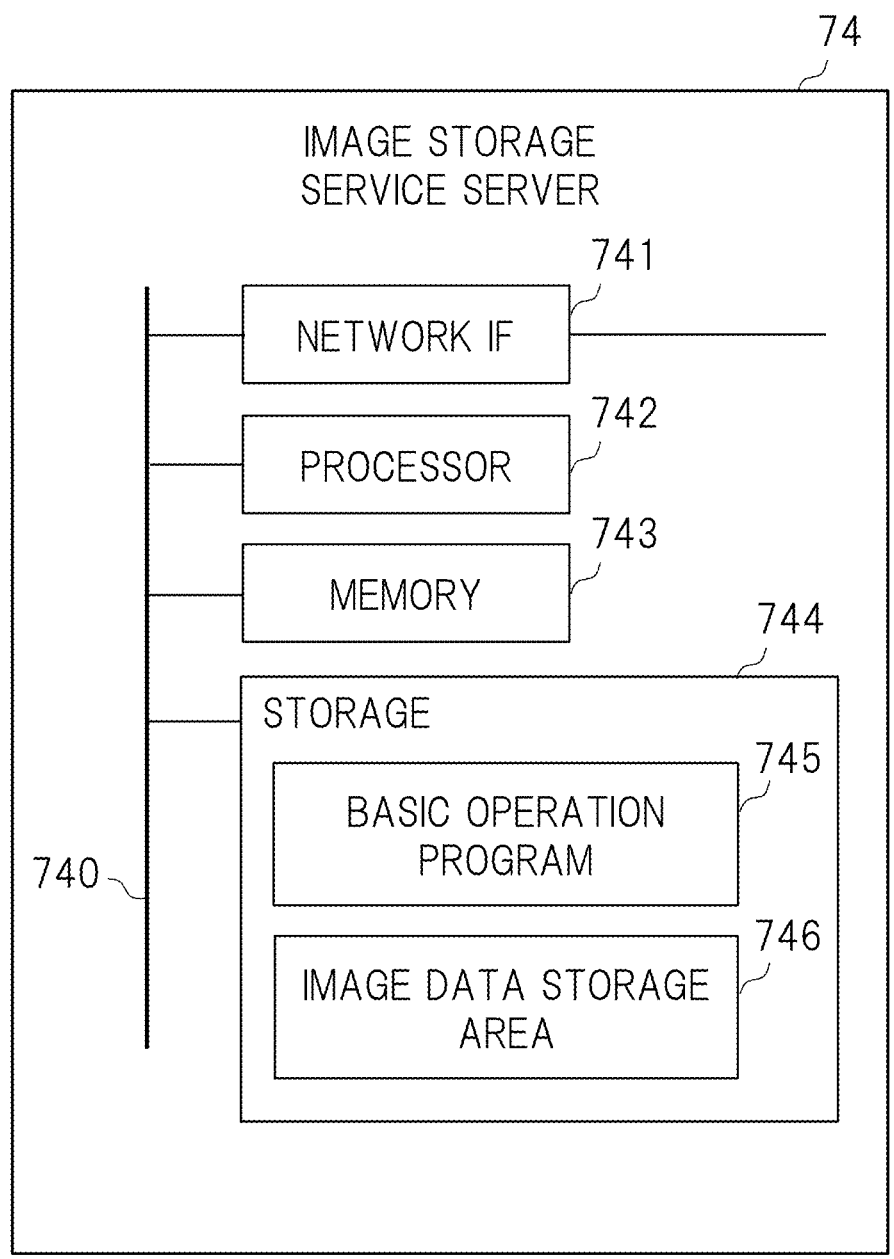

FIG. 8 is a block diagram illustrating a hardware configuration of the image storage service server. As illustrated in FIG. 8, the image storage service server 74 includes an internal bus 740, a network interface (I/F) 741, a processor 742, a memory 743, and a storage 744. The storage 744 stores a basic operation program 745, and is provided with an image data storage area 746. The storage 744 is composed of, for example, a hard disk, a semiconductor memory, or the like.

An image set including a distance image from the HMD 1 is stored in the storage 744 via the network I/F 741, the processor 742, and the like. The basic operation program 745 is executed using the processor 742 and the memory 743 to perform management processing of a plurality of users.
<Mechanism of Image Storage Service>

The user 70 wears the HMD 1 on his/her head and is looking forwards. The HMD 1 is connected to the network 73 via the communication signals 71*a* and 71*b* and the access point 72, and the image storage service server 74 is connected to the network 73.

The HMD 1 executes the dark place guidance program, but the image set of the bright place distance image and the bright place camera image and the metadata are not stored in the HMD 1 but are stored in the image data storage area 746 of the image storage service server 74, and are read out as necessary. Alternatively, a necessary image set group corresponding to the place is downloaded in advance from the image storage service server 74 to the HMD 1 for use. This is the image storage service.

That is, the HMD system includes the image storage service server 74 connected to the network 73 and the HMD 1 connected to the network 73 and configured to communicate with the image storage service server 74.

Furthermore, the HMD 1 includes a camera configured to capture an image in front of the user 70 to obtain a camera image, a distance measurement sensor configured to obtain data representing a distance from the user 70 to a real object corresponding to each position in a visual field region of the camera, an illuminance sensor configured to obtain data representing brightness of a place in which the user 70 is present, and a display configured to display a visual image to be visually recognized by the user 70.

Then, various types of processing as described below are executed by cooperation between the image storage service server 74 and the HMD 1.

[Processing 1-1] Generation processing of generating a distance image which corresponds to a visual field region of a camera and in which each pixel represents a distance to each of the positions mentioned above based on the data obtained by the distance measurement sensor

[Processing 1-2] Determination processing of determining whether a place in which the user 70 is present is a bright place or a dark place based on the data obtained by the illuminance sensor

[Processing 1-3] Storage processing of storing the camera image obtained by the camera and the distance image obtained by the generation processing as an image set including the bright place camera image and the bright place distance image in a case where the place is determined as the bright place by the determination processing

[Processing 1-4] Recognition processing of recognizing the distance image obtained by the above-described generation processing as a dark place distance image in a case where the place is determined as the dark place by the above-described determination processing

[Processing 1-5] Retrieval processing of comparing the bright place distance image stored by the above-described storage processing with the dark place distance image recognized by the above-described recognition processing, thereby specifying the bright place distance image corresponding to the above-described recognized dark place distance image

[Processing 1-6] Decision processing of deciding the visual image based on the bright place camera image included in the same image set as the bright place distance image specified by the above-described specification processing

[Processing 1-7] Display processing of displaying the visual image decided by the decision processing so as to be visually recognized by the user By executing such processing, the image set and the metadata that tend to have a large capacity can be stored in the image storage service server 74 instead of being stored in the HMD 1, and as such the storage capacity of the HMD 1 can be reduced.

In addition, it is possible to perform processing with a large load on the side of the image storage service server 74 instead of the side of the HMD 1 and transmit only a result of the processing to the HMD 1, thereby making it possible to reduce processing specifications of the HMD 1 and realize high-speed processing.

Figure 7B:
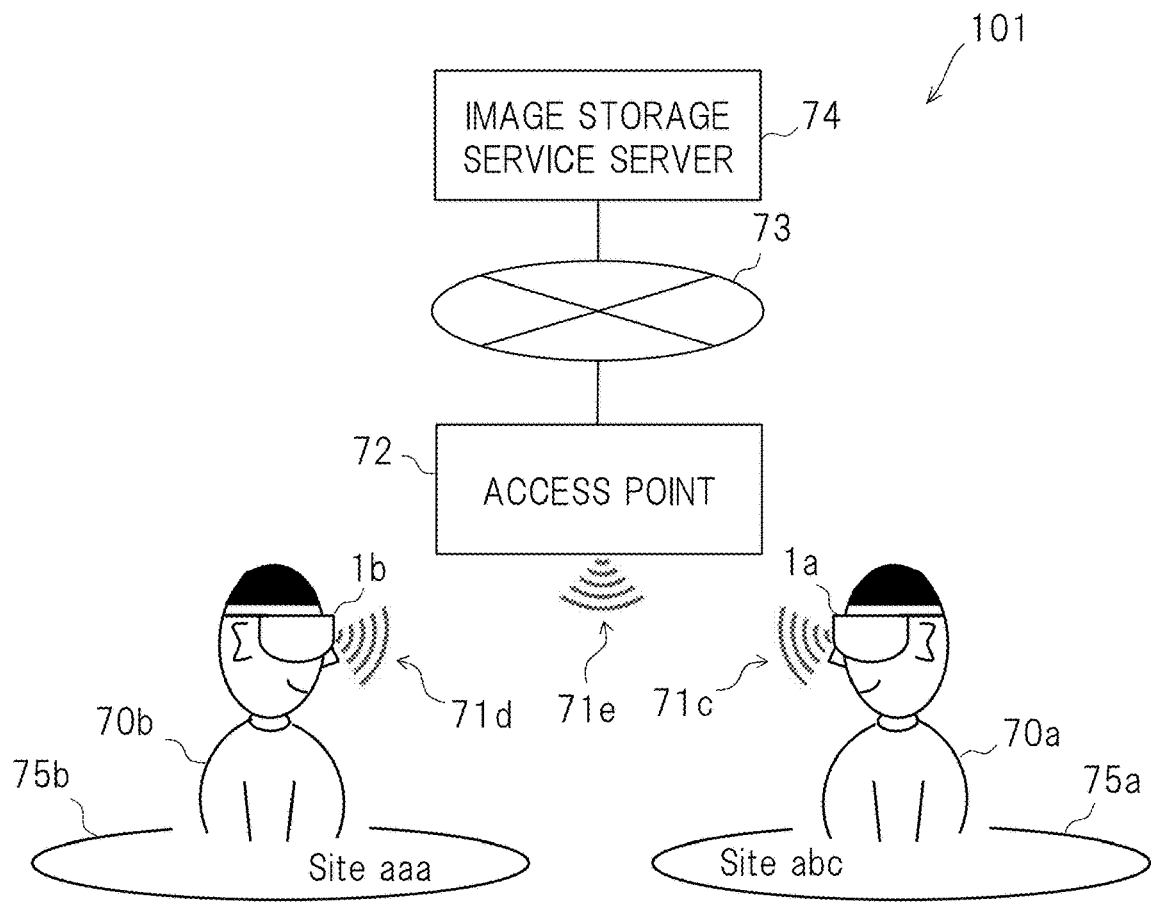

FIG. 7B is a diagram illustrating a second configuration example of the HMD system according to the second embodiment. FIG. 7B illustrates a configuration of an HMD system 101 in which a plurality of HMDs and a server are simultaneously connected to each other via a network. The example illustrated in FIG. 7B is an example of a case in which users wearing the HMD are present at a plurality of places, respectively. A plurality of users may be present in each of the plurality of places. The plurality of users share the image storage service provided by the image storage service server 74.

In FIG. 7B, 1*a* and 1*b* denote HMDs, 70*a* and 70*b* denote users, 71*c*, 71*d*, and 71*e* denote communication signals, 72 denotes an access point, 73 denotes a network, and 74 denotes an image storage service server. The user 70*a* is at a site of Site abc (75*a*) and is using the image storage service, and the user 70*b* is at a site of Site aaa (75*b*) and is using the image storage service. Each of the users stores a bright place camera image and a bright place distance image obtained in a bright place in the image storage service server 74 as an image set corresponding to each position and direction together with metadata. Further, the stored image set can be accessed by the respective users from various places to recall the latest required image set.

That is, the system includes the image storage service server (server) 74 connected to the network 73 and the plurality of HMDs (mobile image display apparatuses) 1*a* and 1*b* connected to the network 73 and configured to communicate with the image storage service server 74.

In addition, each of the plurality of HMDs 1*a* and 1*b* includes a camera configured to capture an image in front of the user 70*a* or 70*b* to obtain a camera image, a distance measurement sensor configured to obtain data representing a distance from each of the users to a real object corresponding to each position in a visual field region of the camera, an illuminance sensor configured to obtain data representing brightness of a place in which the user 70*a* or 70*b* is present, a display configured to display a visual image to be visually recognized by the user 70*a* or 70*b*, and a position information receiver configured to acquire position information of the HMD 1*a* or 1*b*.

Then, in each of the plurality of HMDs 1*a* and 1*b*, various types processing as described below are executed by cooperation between the image storage service server 74 and the HMD.

[Processing 2-1] First generation processing of generating a distance image which corresponds to a visual field region of a camera and in which each pixel represents a distance to each of the positions mentioned above based on the data obtained by the distance measurement sensor

[Processing 2-2] First determination processing of determining whether a place in which the user is present is a bright place or a dark place based on the data obtained by the illuminance sensor

[Processing 2-3] Storage processing of storing, as an image set of a bright place camera image and a bright place distance image, a camera image obtained by the camera and the distance image obtained by the above-described first generation processing in the image storage service server 74 in association with the image set and position information acquired by the position information receiver, in a case where the place is determined as the bright place by the above-described first determination processing In addition, various types of processing as described below are executed by cooperation between the image storage service server 74 and one HMD of the plurality of HMDs 1*a* and 1*b*.

[Processing 2-4] Second generation processing of generating a distance image corresponding to the above-described visual field region and indicating the distance to each of the positions based on the data obtained by the distance measurement sensor

[Processing 2-5] Second determination processing of determining whether the place in which the user is present is the bright place or the dark place based on the data obtained by the illuminance sensor

[Processing 2-6] Recognition processing of recognizing the distance image obtained by the above-described second generation processing as a dark place distance image in a case where the place is determined as the dark place by the above-described second determination processing

[Processing 2-7] Identification processing of identifying a bright place distance image, the position of which indicated by associated position information corresponds to a position indicated by the position information acquired by the above-described position information receiver of the one HMD, from among bright place distance images stored in the image storage service server 74

[Processing 2-8] Retrieval processing of comparing the bright place distance image identified by the above-described identification processing with the dark place distance image recognized by the above-described d recognition processing, thereby specifying the bright place distance image whose matching degree with the above-described recognized dark place distance image is equal to or greater than a threshold

[Processing 2-9] Decision processing of reading the bright place camera image included in the same image set as the bright place distance image specified by the above-described retrieval processing from the image storage service server 74 and deciding the visual image to be displayed by the one HMD based on the read bright place camera image

[Processing 2-10] Display processing of displaying the decided visual image so as to be visually recognized by the user By executing such processing, the image sets are sequentially accumulated by a plurality of users, and the accumulated image sets are shared.

Note that, in the present embodiment, the connection between the HMD and the network is wireless connection, but may be wired connection.

<Data Configuration Example of Image Set>

Here, an example of a data configuration of the image set will be described.

FIG. 9 is a diagram illustrating an example of the data configuration of the image set. As illustrated in FIG. 9, the image set including the camera image and the distance image and the metadata thereof are associated with each other to constitute a data set T10.

The data set T10 includes a service IDT11 of the image storage service and position information (including site information (place information) if the site information can be specified) T12*a* and T12*b*. The position information is GPS coordinates obtained from a GPS sensor, and the site information is a name of a site, a building, or the like specified from the GPS coordinates. The data of the image set is classified for each place or position information in this manner.

The data set T10 includes dates and times T13a and T13b when the image set is acquired. The data set T10 may include orientation data representing the orientation in which a user is facing. The data set 10 further includes camera image data T14a and T14b and distance image data T15a and T15b. The camera image and the distance image are managed as a pair of data.

Note that, in the example illustrated in FIG. 9, the site (place) is an inside of a building as an example, but outdoor position information detected from a GPS or the like may be used.

In addition, by registering image data that does not have a distance image, such as a camera image captured by a smartphone, it is possible to widely collect and store camera images. In this case, a matching degree between places may be estimated by comparison with the camera image having the stored distance image. For example, the comparison may be performed using contour components of the camera image and the distance image.

According to the second embodiment described above, the HMD system having the effect similar to that of the HMD according to the first embodiment can be realized, and the implementation cost of the HMD can be reduced by storing the image data in the server. In addition, since images stored by a plurality of users can be shared and used by a plurality of users, a synergistic effect is generated, and a range of available places of the present system or a range of users of the present system can be expanded.

Third Embodiment

A third embodiment of the present invention will be described.

Outline of Third Embodiment

The third embodiment is an HMD configured to detect a difference region between a dark place distance image and a bright place distance image corresponding thereto and decide a visual image according to a detection result thereof. That is, in a case where there is a difference region between a dark place distance image at the current time and a bright place distance image corresponding to the dark place distance image, the HMD according to the present embodiment finds out which of the distance images has the generation factor of the difference region and decides a more appropriate visual image by executing processing according to the result.

Note that a hardware configuration of the HMD according to the third embodiment is similar to that of the HMD according to the first embodiment, and thus the description thereof will be omitted.
<Functional Configuration of HMD>

Figure 10:
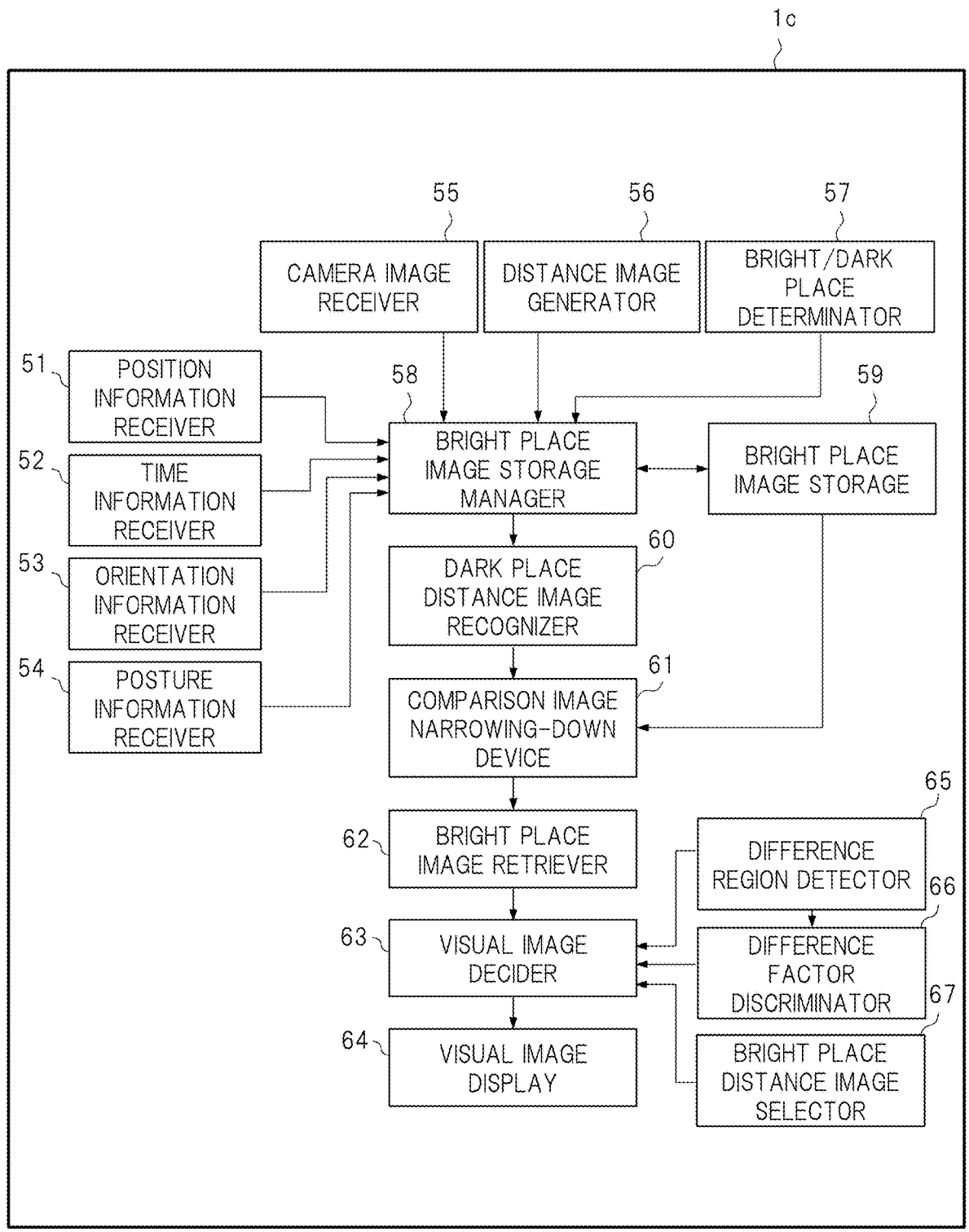
FIG. 10 is a functional block diagram illustrating a functional configuration of an HMD according to a third embodiment.

FIG. 10 is a f diagram illustrating a functional configuration of the HMD according to the third embodiment.

As illustrated in FIG. 10, an HMD 1c according to the third embodiment further includes a difference region detector (detector) 65, a difference factor discriminator (discriminator) 66, and a bright place distance image selector (selector) 67 based on the functional configuration of the HMD 1 according to the first embodiment.

The difference region detector 65 detects a difference region between the dark place distance image at the current time and the specified past bright place distance image.

In a case where the difference region between the dark place distance image at the current time and the specified past bright place distance image is detected, the difference factor discriminator 66 performs analysis by comparing both distance images, and discriminates whether a generation factor of the difference is on the side of the dark place distance image or the side of the bright place distance image.

The bright place distance image selector 67 determines whether the bright place distance image corresponding to the dark place distance image at the current time and having an acquisition time point in the further past than that of the previously specified bright place distance image is stored. Then, such a bright place distance image is selected and read as a further past bright place distance image.

The visual image decider 63 edits and decides the visual image according to presence or absence of a difference between the dark place distance image and the bright place distance image, the generation factor in a case where there is the difference therebetween, presence or absence of the further past bright place distance image, and the like.
<Flow of Decision Processing of Visual Image)

The processing flow of the dark place guidance program according to the third embodiment is basically similar to that of the first embodiment, but is different only in a part of the decision processing of the visual image. Therefore, only the flow of the decision processing of the visual image will be described here, and description of the other flow will be omitted.

Figure 11A:
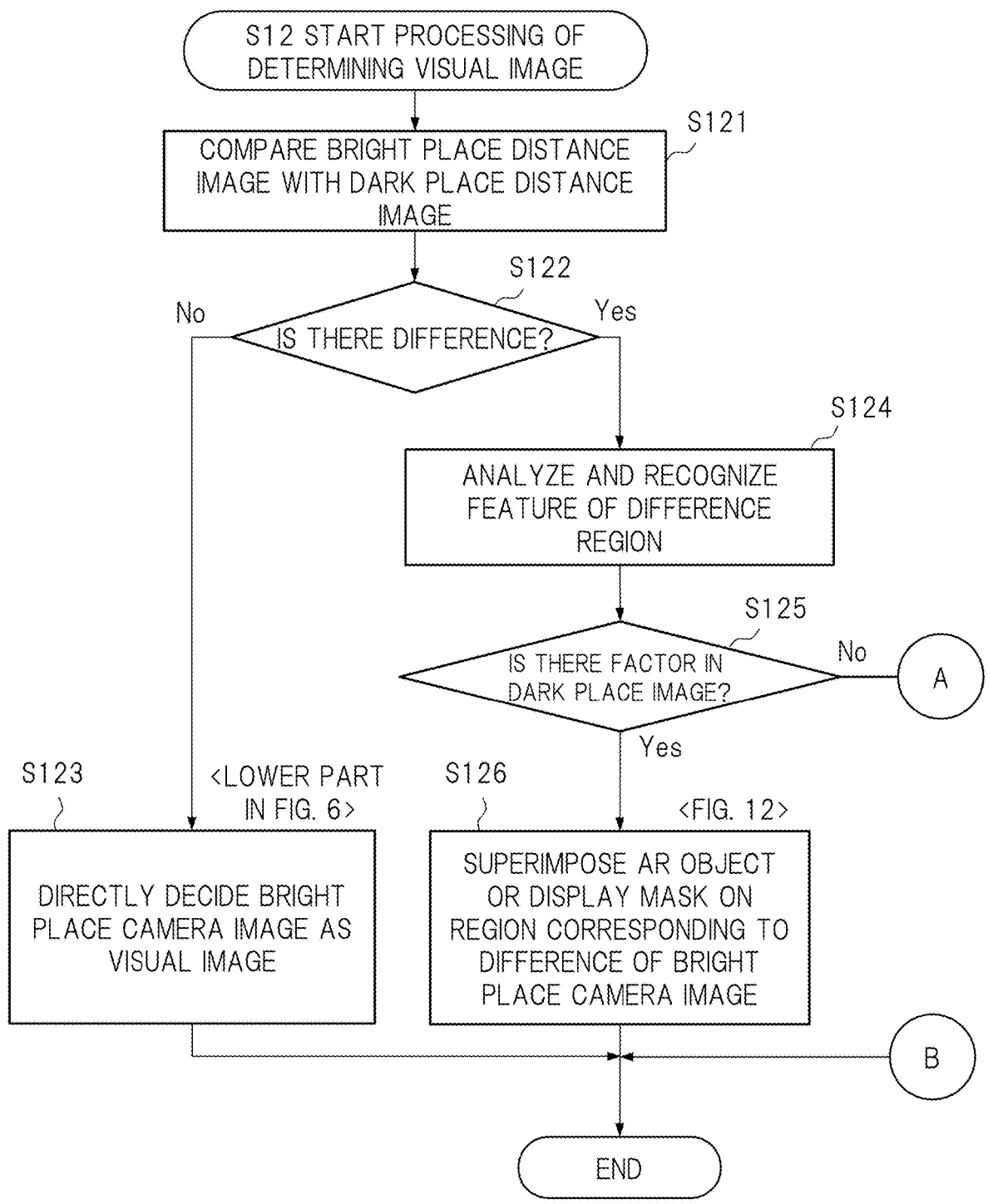
FIG. 11A is a flowchart of decision processing of a visual image according to the third embodiment.
Figure 11B:
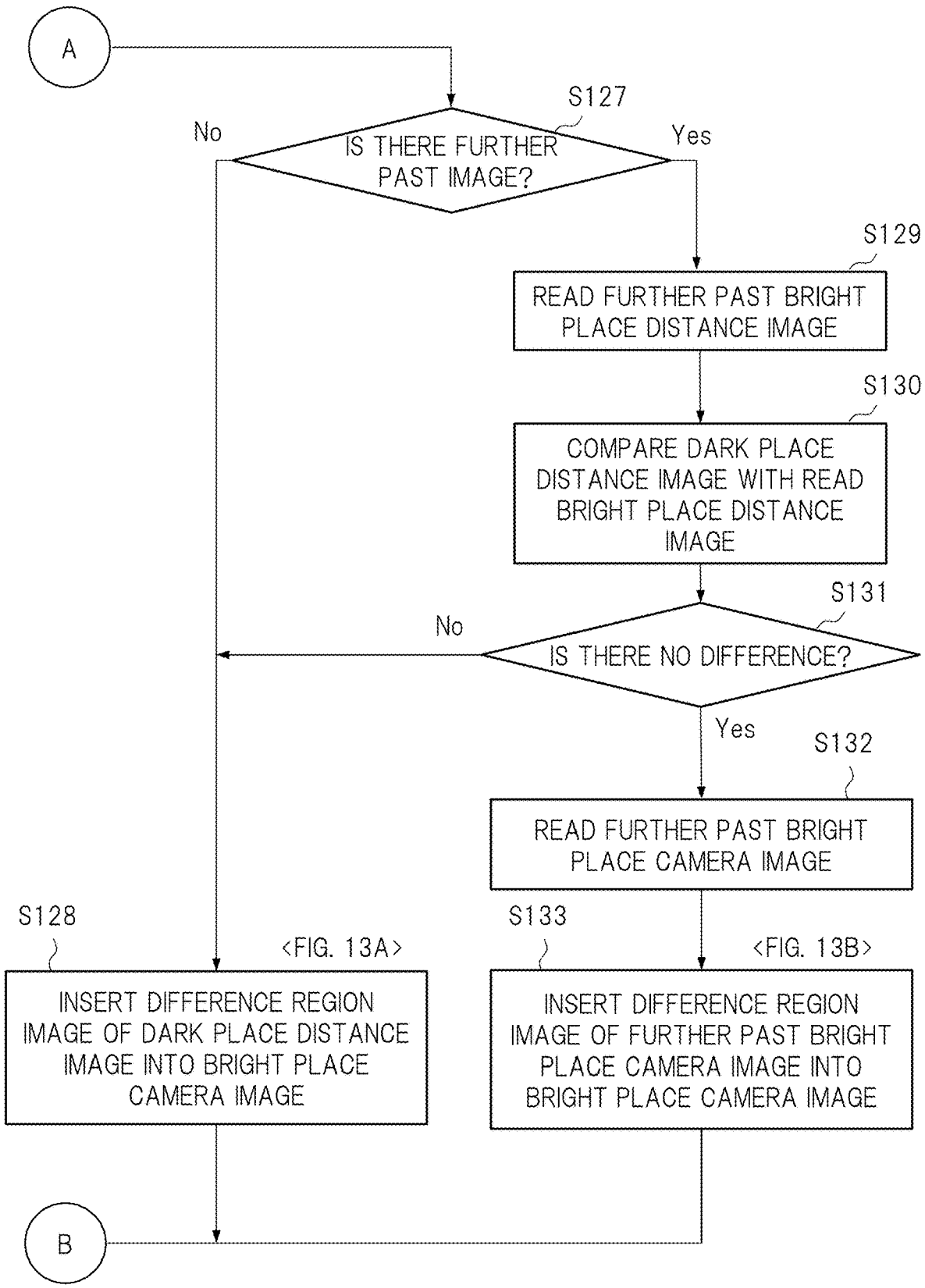
FIG. 11B is a flowchart of the decision processing of the visual image according to the third embodiment.

FIG. 11A and FIG. 11B are flowcharts of the decision processing of the visual image according to the third embodiment. These flowcharts correspond to step S12 in the processing flow according to the first embodiment illustrated in FIG. 4.

In step S121, processing of comparing the bright place distance image and the dark place distance image is performed. Specifically, the difference region detector 65 compares the bright place distance image with the dark place distance image.

In step S122, processing of determining whether there is a difference between the compared distance images is performed based on a comparison result in step S121. Specifically, the difference region detector 65 determines whether there is a difference between the past bright place distance image and the dark place distance image at the current time based on the above comparison result. Here, when it is determined that there is no difference therebetween, that is, when it is determined that the two distance images substantially match each other in the entire image region (S122, No), the flow proceeds to step S123. On the other hand, when it is determined that there is the difference therebetween (S122, Yes), the flow proceeds to step S124.

In step S123, processing of directly deciding the bright place camera image as the visual image is performed. Specifically, the visual image decider 63 decides the bright place camera image as the visual image. This corresponds to the example of decision of the visual image described with reference to FIG. 6. In this way, the decision processing of the visual image ends.

In step S124, processing of analyzing the feature of the difference region and recognizing the generation factor thereof is performed. Specifically, the difference factor discriminator 66 respectively analyzes the features of the difference regions in both distance images. Then, based on the analysis result, the difference factor discriminator 66 discriminates whether the generation factor of the difference region is on the side of the dark place distance image or the side of the bright place distance image.

For example, when discontinuous distance data is found in the region of the dark place distance image, it can be determined that there is a sudden displacement in the dark place distance image. Conversely, when discontinuous distance data is found in the region of the bright place distance image, it can be determined that there is a sudden displacement in the bright place distance image.

Furthermore, for example, in a case where an object included in the difference region is a person, a movable object, an artificial object, or the like, it can be thought that the difference region may have occurred due to a difference caused by the movement of the object.

Note that the subsequent processing varies depending on whether the generation factor of the difference exists at present or in the past and what the object included in the difference region is.

In step S125, processing of discriminating whether there is a generation factor of a difference in the dark place distance image is performed. Specifically, the difference factor discriminator 66 discriminates which one of the dark place distance image and the bright place distance image has the generation factor of the difference based on the above-described analysis result. In this discrimination, when it is discriminated that there is the generation factor of the difference in the dark place distance image (S125, Yes), the flow proceeds to step S126. On the other hand, in this discrimination, when it is discriminated that there is the generation factor of the difference in the bright place distance image (S125, No), the flow proceeds to step S127.

In step S126, processing of obtaining a visual image by inserting a mask image or an AR object into a difference region of the bright place camera image is performed. Specifically, the visual image decider 63 obtains the visual image by performing emphasis processing on a region corresponding to the difference region in the specified bright place camera image. For example, the mask image or the AR object is inserted into the region corresponding to the difference region of the bright place camera image. In a case where the object included in the difference region can be recognized, the AR object corresponding to the object is inserted. In a case where the object included in the difference region cannot be recognized, or in a case where such an AR object is not prepared, the visual image is obtained by performing emphasis processing such as superimposing the mask image on the region corresponding to the difference region of the bright place camera image. In this way, the decision processing of the visual image ends.

Here, the example of decision of the visual image in step S126 will be described with reference to the drawings.

FIG. 12 is a diagram illustrating a first example of decision processing of the visual image by the HMD according to the third embodiment. FIG. 12 illustrates an example of deciding the visual image by superimposing the mask image or the AR object on the bright place camera image. This example shows a case in which the difference between the distance images is caused by the dark place distance image at the current time.

In a dark place distance image 83E at current time, there is a person as a difference region 87. No person is present in a corresponding bright place distance image 81B. It is inappropriate that the entire region of a bright place camera image 80B is cited to be the visual image because there is a possibility of collision with a person when a user acts in the real space. Therefore, based on the bright place camera image 80B, for example, an emphasizing mask 88A is added to a corresponding region 87C of the difference region. According to this example, it is possible to call the user's attention.

Alternatively, in a case where it can be recognized that the difference region 87 is a person by analyzing the feature of the difference region 87, an AR object 88B of the person is added to the corresponding region 87C of the difference region based on the bright place camera image 80B. According to this example, it is possible to transmit details of the difference to the user.

In step S127, processing of determining whether there is a bright place distance image that corresponds to the dark place distance image at the current time and is acquired at a time point in the further past is performed. Specifically, the bright place distance image selector 67 determines whether the bright place distance image corresponding to the dark place distance image at the current time and having an acquisition time point in the further past than that of the previously specified bright place distance image is stored. In this determination, when it is determined that there is no such a further past bright place distance image (S127, No), the flow proceeds to step S128. On the other hand, in this determination, when it is determined that there is such a further past bright place distance image (S127, Yes), the flow proceeds to step S129.

In step S128, processing of deciding the visual image by inserting an image portion of the difference region of the dark place distance image into the difference region of the bright place camera image is performed. Specifically, the visual image decider 63 acquires the past bright place camera image and decides, as the visual image, an image obtained by inserting or attaching the image portion of the difference region of the dark place distance image into the difference region thereof.

Here, an example of decision of the visual image in step S128 will be described with reference to the drawings.

Figure 13A:
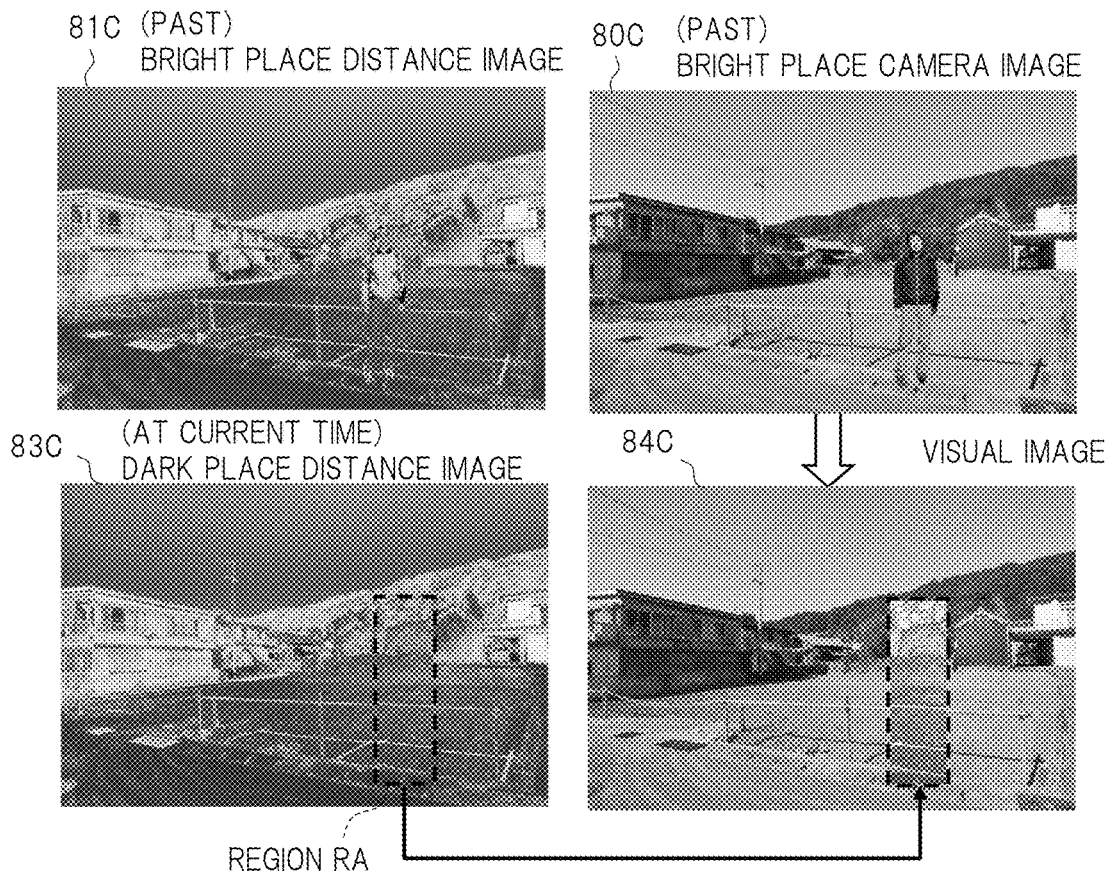
FIG. 13A is a diagram illustrating a second example of the decision processing of the visual image by the HMD according to the third embodiment.

FIG. 13A is a diagram illustrating a second example of the decision processing of the visual image by the HMD according to the third embodiment. FIG. 13A illustrates an example in which the visual image is obtained by attaching a part of the dark place distance image to the bright place camera image. In FIG. 13A, 81C denotes a stored bright place distance image, 80C denotes a stored bright place camera image, 83C denotes a dark place distance image, and 84C denotes a visual image to be visually recognized by the user. There is a partial difference between the distance images 81C and 83C. A region RA of the dark place distance image 83C is the difference region, and there is a person in the region corresponding to the difference region in the bright place distance image 81C. At this time, if the entire region of the bright place camera image 80C is applied as the visual image, the user is misled as if there is a person who is not present at present.

Therefore, the image portion of the difference region RA in the dark place distance image 83C is superimposed on the corresponding region in the bright place camera image 80C to obtain the visual image 84C.

In step S129, processing of reading a further past bright place distance image is performed. Specifically, the bright place distance image selector 67 reads a further past bright place distance image corresponding to the dark place distance image at the current time.

In step S130, processing of comparing and analyzing the dark place distance image with the further past bright place distance image is performed. Specifically, the visual image decider 63 compares the dark place distance image at the current time with the read further past bright place distance image. Then, analysis necessary for determining whether there is a difference between these distance images is performed.

In step S131, it is determined whether there is the difference between the dark place distance image and the further past bright place distance image. Specifically, the visual image decider 63 determines whether there is the difference between the dark place distance image at the current time and the read further past bright place distance image based on the comparison and analysis result in step S130. In this determination, when it is determined that there is the difference therebetween (S131, No), the flow proceeds to step S128. On the other hand, in this determination, when it is determined that there is no difference therebetween (S131, Yes), the flow proceeds to step S132.

In step S132, processing of reading the further past bright place camera image is performed. Specifically, the visual image decider 63 reads the further past bright place camera image included in the same image set as the further past bright place distance image from the bright place image storage 59.

In step S133, processing of deciding the visual image by inserting an image portion of the difference region of the further past bright place camera image into the difference region of the bright place camera image is performed. Specifically, the visual image decider 63 decides, as the visual image, an image obtained by inserting or attaching the image portion of the difference region in the further past bright place camera image into the difference region of the specified past bright place camera image.

Here, an example of decision of the visual image in step S133 will be described with reference to the drawings.

Figure 13B:
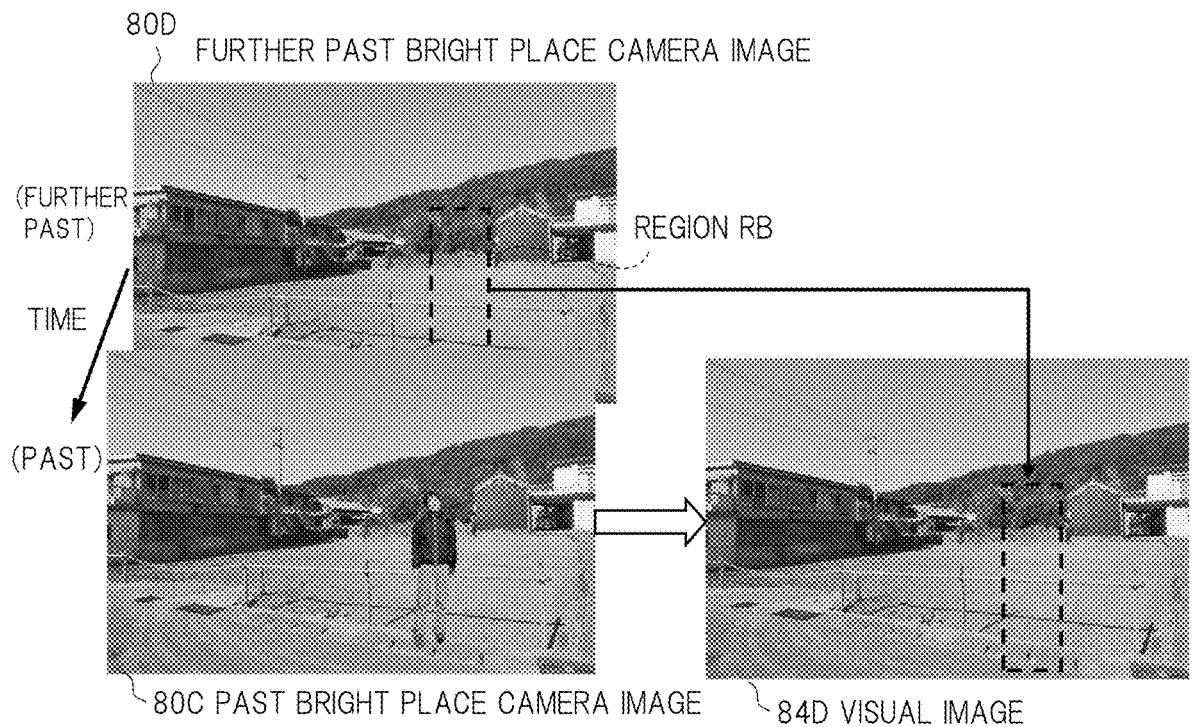
FIG. 13B is a diagram illustrating a third example of the decision processing of the visual image by the HMD according to the third embodiment.

FIG. 13B is a diagram illustrating a third example of the decision processing of the visual image by the HMD according to the third embodiment. FIG. 13B illustrates an example in which the visual image is decided by attaching a part of the further past bright place camera image to the past bright place camera image. In FIG. 13B, the situation is the same as the example illustrated in FIG. 13A, but the visual image is decided with reference to a further past bright place camera image 80D stored at a time in the further past than the past bright place camera image 80C. That is, an image portion corresponding to a region RB of the further past bright place camera image 80D is inserted into the past bright place camera image 80C to obtain a visual image 84D. The further past bright place camera image 80D is a camera image obtained by imaging when there is no person. The visual image 84D is obtained by superimposing the image portion of the region RB corresponding to the region RA in the further past bright place camera image 80D on the corresponding region of the bright place camera image 80C.

Note that the entire image of the past bright place camera image 80D may be directly used as the visual image, but it is possible to obtain a clearer image by adopting a clearer one from among the stored camera images as the entire image and inserting an image portion of the other past bright place camera image into only a partially different region.

Furthermore, as another method, a bright place image in a time zone desired by the user may be selected and used as the entire area image. For example, an image in the evening time may be used as the entire area image.

Note that, in the present embodiment, a person has been described as an example of the difference region, but the difference region is not limited to a person in practice. For example, living things such as animals, moving bodies such as an automobile, a bicycle, a motorcycle, a wagon, and a rear car, newly installed equipment, a placed member, and the like are conceivable as the difference region. Examples of the object that does not move include a building and a road sign. Furthermore, in order to further recognize these objects, a machine learning technique may be used to discriminate the objects to be the difference.

Furthermore, in a case where an obstacle newly occurs with respect to the past bright place camera image, an emphasizing display may be performed such that attention is paid to the obstacle.

Furthermore, in a case where it is possible to determine what the object is, a CG image, a sign, or text data to be a substitute thereof may be displayed.

By performing such processing, it is possible to secure a safe route without hitting or stumbling on an obstacle even in a dark place.

In addition, the factor that the difference between distance images is caused by a current distance image may be other than the appearance of a new object in the current dark place distance image. For example, there is a case in which something that should be there disappears, for example, road caving or bridge falling in a disaster site or the like. Even in such a case, as described with reference to FIG. 11A and FIG. 11B, it is possible to transmit the details of the difference to the user by processing the features in accordance with the difference region 87, recognizing what the difference region is, and superimposing the AR object corresponding thereto.

According to the third embodiment described above, it is possible to decide the visual image in accordance with the occurrence situation of the difference region, and realize high performance in generating the visual image of the dark place guidance function.

Fourth Embodiment

A fourth embodiment of the present invention will be described.

Outline of Fourth Embodiment

The fourth embodiment is an HMD configured to perform processing such as parallel movement, rotation movement, and scaling (enlargement/reduction) of a distance image in the processing of comparison and matching determination between distance images. Note that a hardware configuration of the HMD according to the fourth embodiment is similar to that of the HMD according to the first embodiment, and thus the description thereof will be omitted.

<Processing Flow of Comparison and Matching Determination Between Distance Images>

The processing flow of the dark place guidance program according to the fourth embodiment is basically similar to that of the first embodiment, but is different only in a part of the processing of comparison and matching determination between distance images. Therefore, only the flow of the processing of the comparison and the matching determination between the distance images will be described here, and description of the other flow will be omitted.

Figure 14:
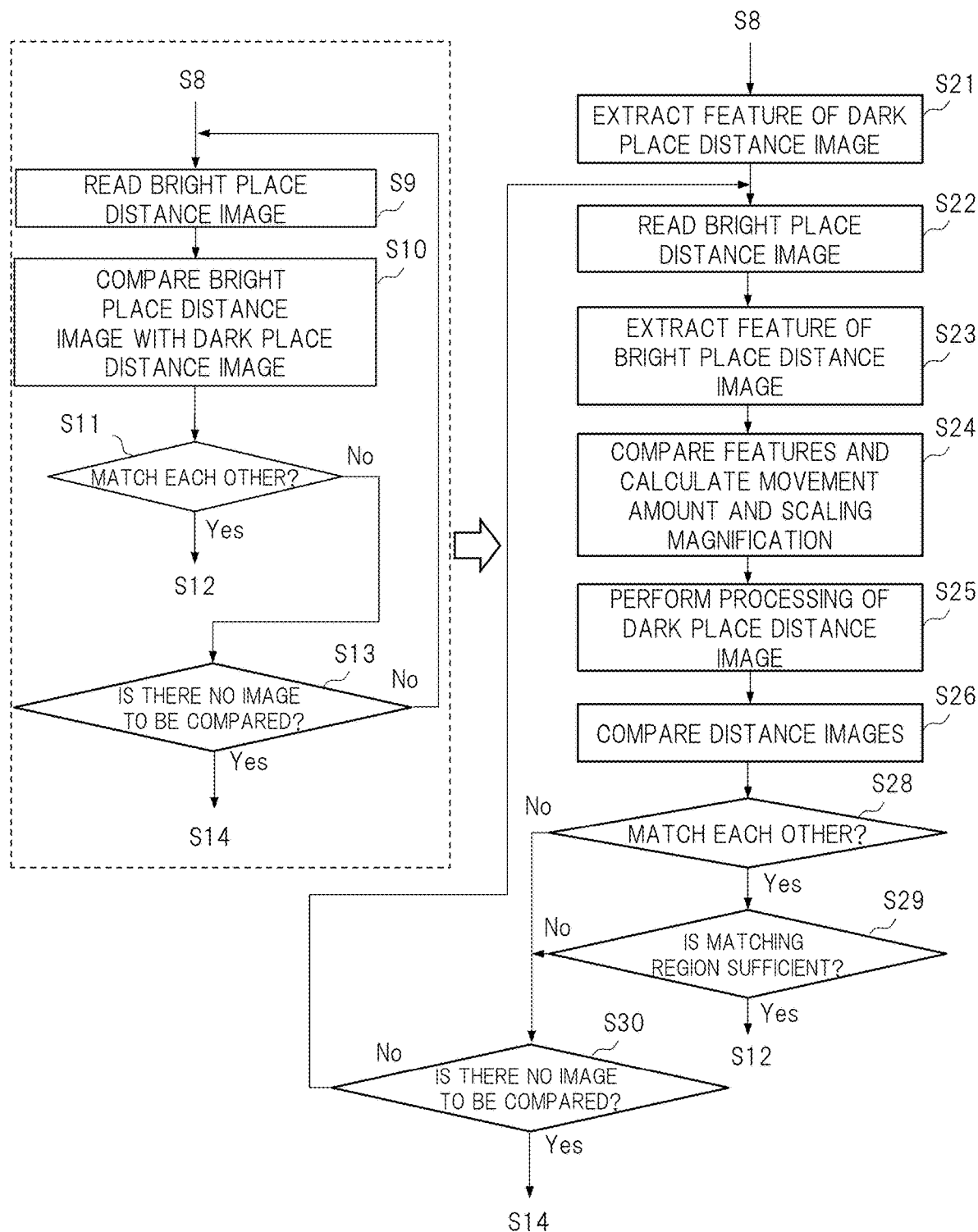
FIG. 14 is a flowchart of processing of comparison and matching determination between distance images according to a fourth embodiment.
Figure 15A:
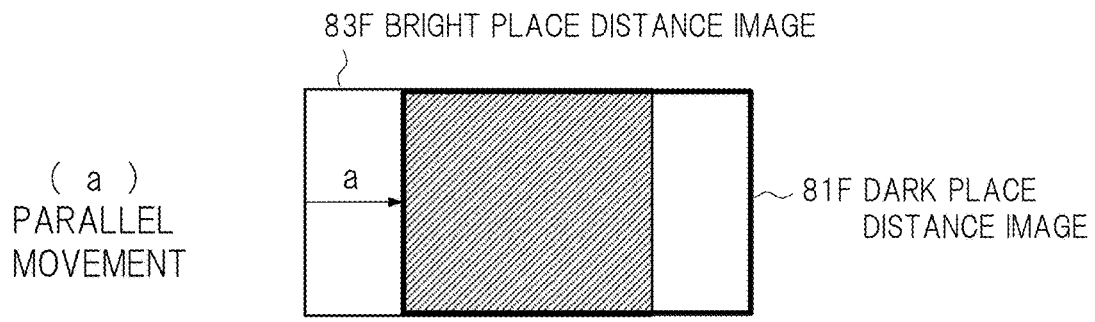
FIG. 15A is a diagram illustrating parallel movement processing in the third embodiment.
Figure 15B:
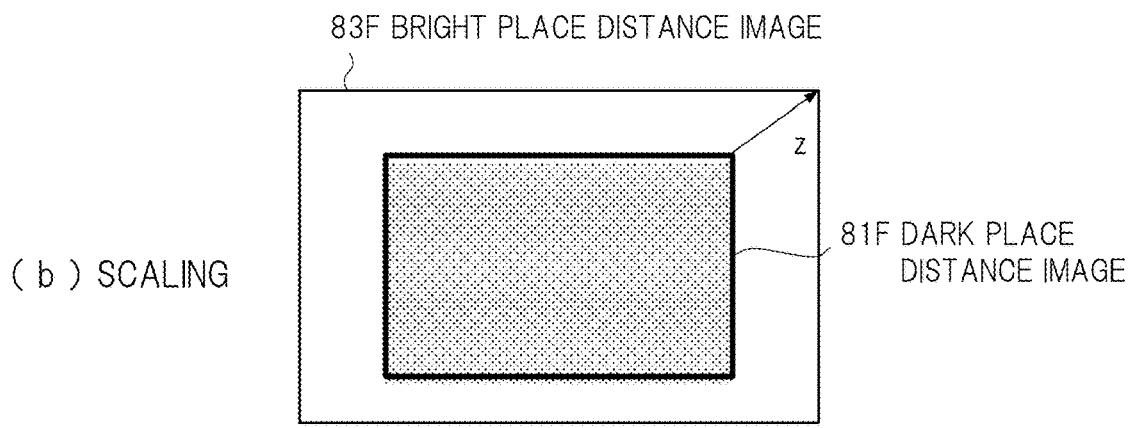
FIG. 15B is a diagram illustrating scaling processing in the third embodiment.
Figure 15C:
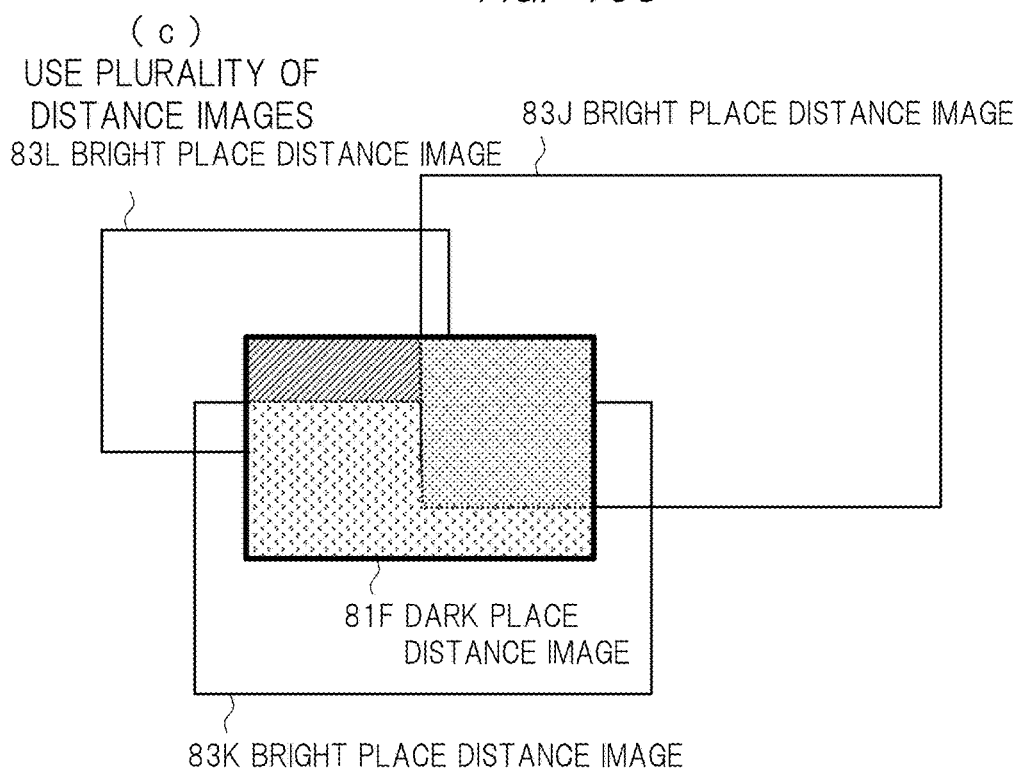
FIG. 15C is a diagram illustrating combination processing using a plurality of distance images in the third embodiment.

FIG. 14 is a flowchart of the processing of the comparison and the matching determination between the distance images according to the fourth embodiment. This flowchart corresponds to steps S9 to S11 and S13 in the entire processing flow in FIG. 4 surrounded by a dashed line in FIG. 14. In addition, FIG. 15A to FIG. 15C are diagrams each illustrating an example of processing used for the comparison and the matching determination between the distance images according to the fourth embodiment.

In step S21, processing of extracting a feature of a dark place distance image is performed. Specifically, the bright place image retriever 62 extracts the feature of the recognized dark place distance image.

In step S22, processing of acquiring a bright place distance image is performed. Specifically, the bright place image retriever 62 reads one image from among the narrowed bright place distance images.

In step S23, processing of extracting a feature of the bright place distance image is performed. Specifically, the distance image retriever 62 extracts the feature of the read bright place distance image.

In step S24, processing of comparing the extracted features and calculating the movement amount and the scaling magnification of the distance image is performed. Specifically, the distance image retriever 62 compares the feature of the dark place distance image with the feature of the bright place distance image, and calculates the movement amount of the distance image and the scaling magnification of the distance image while focusing on the same feature.

In step S25, processing of moving and enlarging/reducing the dark place distance image is performed. Specifically, the distance image retriever 62 moves and enlarges/reduces the dark place distance image with the calculated movement amount and scaling magnification. Here, in steps S24 and S25, when a distance from the image capturing position is changed due to scaling, the comparison between the distance images can be facilitated if the color indicating the perspective of the distance image is changed in accordance with the scaling magnification.

In step S26, processing of comparing the distance images is performed. Specifically, the distance image retriever 62 compares the dark place distance image subjected to the movement and enlargement/reduction processing with the bright place distance image.

In step S28, processing of determining whether the distance images match each other is performed. Specifically, the distance image retriever 62 determines whether the dark place distance image and the bright place distance image match each other based on the comparison result. In this determination, when it is determined that the dark place distance image and the bright place distance image match each other (S28, Yes), the flow proceeds to step S29. On the other hand, in this determination, when it is determined that the dark place distance image and the bright place distance image do not match (S28, No), the flow proceeds to step S30.

In step S29, processing of determining whether a matching region is sufficient is performed. Specifically, the distance image retriever 62 determines whether a coverage ratio of the region in which the recognized dark place distance image and the read bright place distance image match each other to the entire region is greater than a specified value. In this determination, when it is determined that the coverage ratio is greater than the specified value (S29, Yes), the flow proceeds to step S12. On the other hand, when it is determined that the coverage ratio is equal to or less than the specified value (S29, No), the flow proceeds to step S30.

In step S30, processing of determining whether all the comparisons with respect to the narrowed bright place distance images have been completed is performed. Specifically, the distance image retriever 62 determines whether all the comparisons have been completed and there remains no bright place distance image to be compared next. Here, when it is determined that all the comparisons have been completed, that is, when it is determined that there remains no bright place distance image to be compared (S30, Yes), the flow proceeds to step S14. On the other hand, when it is determined that all the comparisons have not been completed, that is, when it is determined that there still remains the bright place distance image to be compared (S30, No), the flow returns to step S22, and the bright place distance image to be compared next is read.

FIG. 15A is a diagram illustrating parallel movement processing in the third embodiment. FIG. 15B is a diagram illustrating scaling processing in the third embodiment. FIG. 15C is a diagram illustrating combination processing using a plurality of distance images in the third embodiment.

In FIG. 15A, a thick frame denoted by 81F is a dark place distance image, and a thin frame denoted by 83F is a bright place distance image. In FIG. 15A, in a case where matching between the two distance images is observed in a hatched region when the dark place distance image is shifted by a distance "a", the visual image is decided using a bright place camera image of the hatched region.

In FIG. 15B, in a case where matching between the two distance images is observed when the dark place distance image 81F is multiplied by "z", the visual image is decided using the bright place camera image multiplied by "1/z".

In FIG. 15A and FIG. 15B, a region having a margin may be filled with, for example, a dark place distance image or another past camera image.

FIG. 15C illustrates a case in which a plurality of bright place distance images 83J, 83K, and 83L are compared with the dark place distance image 81F. Although this example is not described in the above flow, processing like this may be incorporated. In this example, in a case where the dark place distance image 81F partially matches each of the bright place distance images 83J, 83K, and 83L, the visual image is generated by cutting and synthesizing the bright place camera images corresponding to the matching regions.

At this time, the bright place distance images 83J, 83K, and 83L may be superimposed such that a clearer image is prioritized, that is, the clearer image is positioned higher (on the front side). Alternatively, the bright place distance images may be superimposed such that an image whose acquisition date and time is newer is prioritized, that is, an image whose acquisition date and time is newer is positioned higher. In the example illustrated in FIG. 15C, clarity of the images is higher in the order of the bright place distance image 83J, the bright place distance image 83K, and the bright place distance image 83L, and the bright place distance image 83J, the bright place distance image 83K, and the bright place distance image 83L are arranged to be superimposed in this order from the top with priority given to a clearer image.

Note that, in the present embodiment, an object to be subjected to various types of processing such as the parallel movement, the rotation movement, and the scaling is the dark place distance image, but the processing may be applied to the bright place distance image to perform comparison processing between the distance images. Furthermore, in a case where a wide-angle image is captured using a 360-degree camera at the time of image capturing, an image in front of the user's HMD may be cut out and stored at a predetermined angle of view based on the position and the direction of the HMD. Furthermore, in a case of recording a plurality of captured images, by causing directions of captured images at the same position to match each other in advance, images having substantially the same position and direction may be recorded in association with each other.

According to the fourth embodiment described above, it is possible to easily find an image in a bright place substantially matching a dark place distance image.

Fifth Embodiment

A fifth embodiment of the present invention will be described.

Outline of Fifth Embodiment

The fifth embodiment is an HMD configured to perform processing suitable for a case in which a partial region in front of a user is illuminated by a light source although a place in which the user is present is a dark place.
<Configuration of HMD According to Fifth Embodiment>

Figure 16:
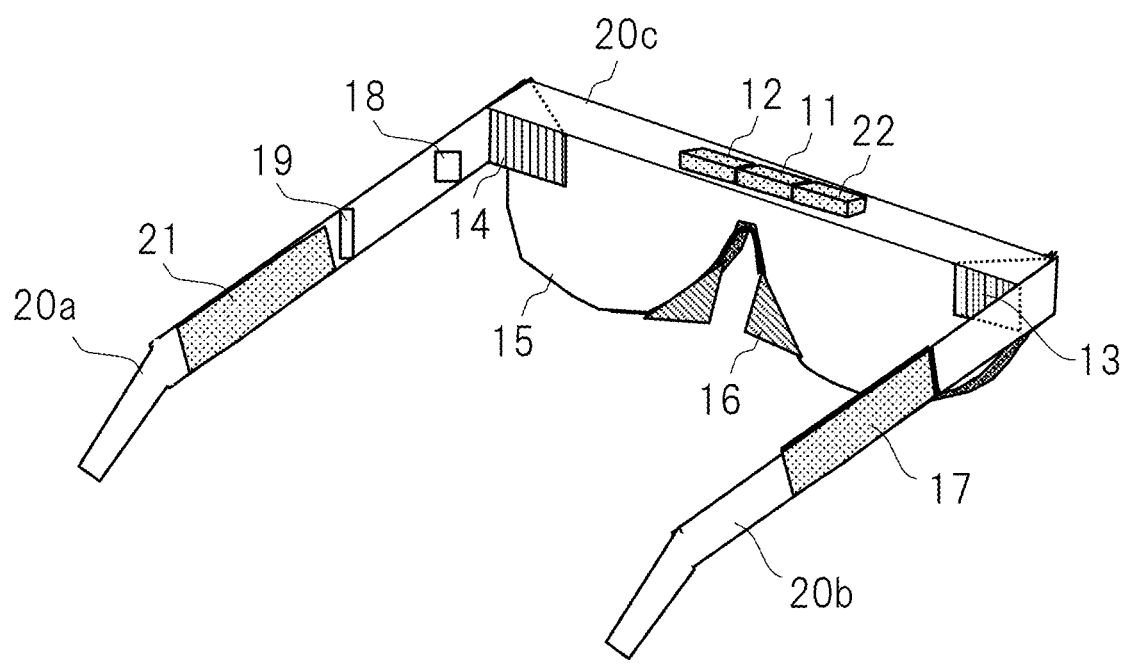
FIG. 16 is an external view of an HMD according to a fifth embodiment.

FIG. 16 is an external view of the HMD according to the fifth embodiment. The same components as those of the HMD 1 illustrated in FIG. 1 are denoted by the same reference numbers, and redundant description will be omitted. An HMD 1d illustrated in FIG. 16 has a configuration in which a headlight 22 serving as an auxiliary light source is added to the HMD 1 illustrated in FIG. 1.

Figure 17:
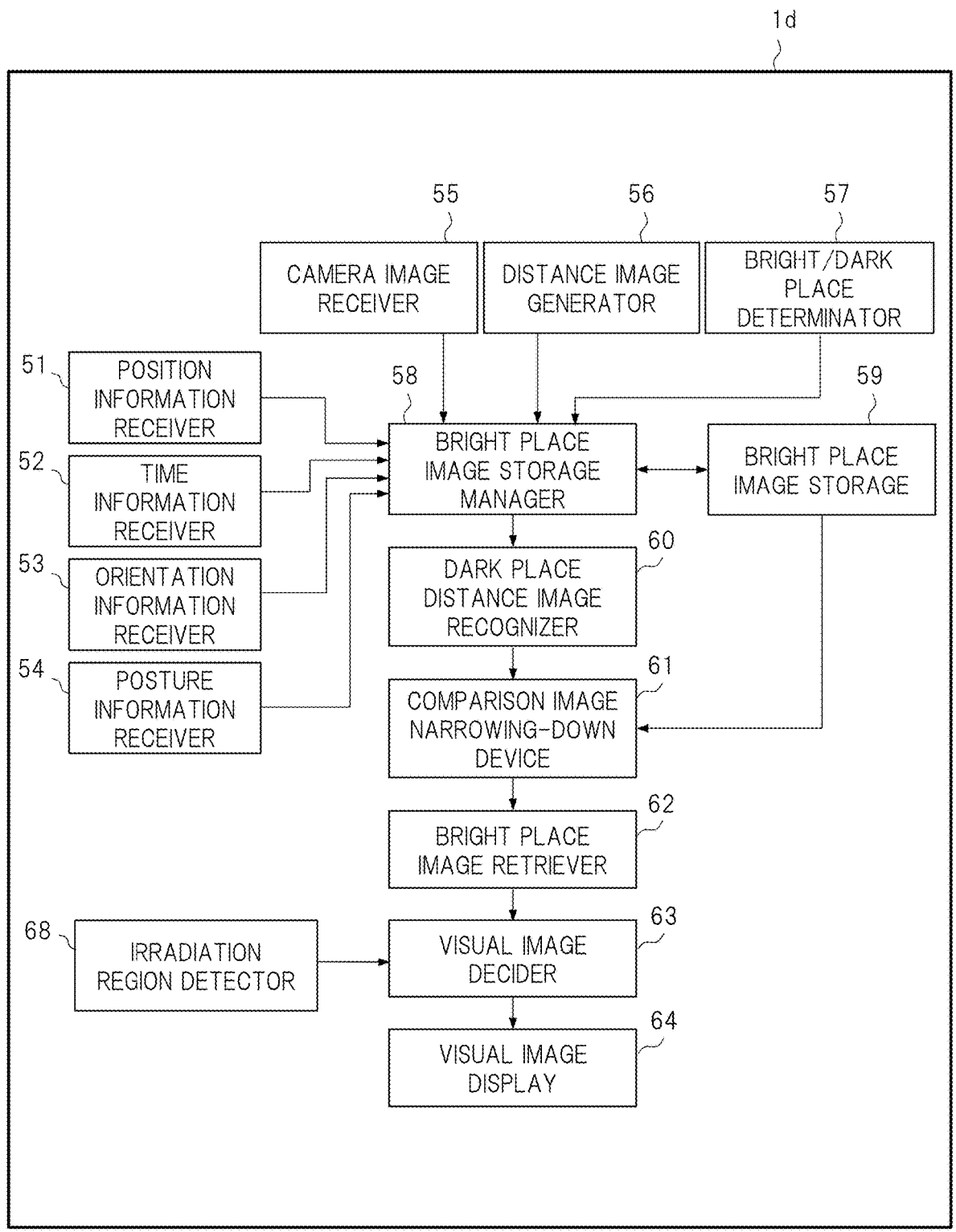
FIG. 17 is a functional block diagram of the HMD according to the fifth embodiment.

FIG. 17 is a functional block diagram of the HMD 1d according to the fifth embodiment. The same blocks as those in the functional block diagram illustrated in FIG. 3 are denoted by the same reference numbers, and redundant description will be omitted. In the functional block diagram illustrated in FIG. 17, the HMD 1d has a configuration in which an irradiation region detector (detector) 68 is added with respect to the functional block diagram illustrated in FIG. 3.

The irradiation region detector 68 detects a spot irradiation region, which is a partial region brightened by being irradiated by the light source, in the dark place camera image obtained by the camera.

In the bright place camera image or the dark place distance image decided as the basis of the visual image, the visual image decider 63 attaches an image portion of the spot irradiation region in the dark place camera image to a corresponding region of the detected spot irradiation region. In this way, the visual image is decided.

Note that the irradiation region detector 68 is implemented by allowing the processor 36 to execute the dark place guidance program 42 with the memory 37 and the like.

Furthermore, in the present embodiment, it is assumed that a partial region in front of the user is illuminated by the headlight 22 included in the HMD 1d. However, a case where a flashlight held by the user or distant illumination light illuminates a partial region in front of the user can also be regarded as the same environment. Therefore, the fifth embodiment can be similarly applied to these cases.

Figure 18:
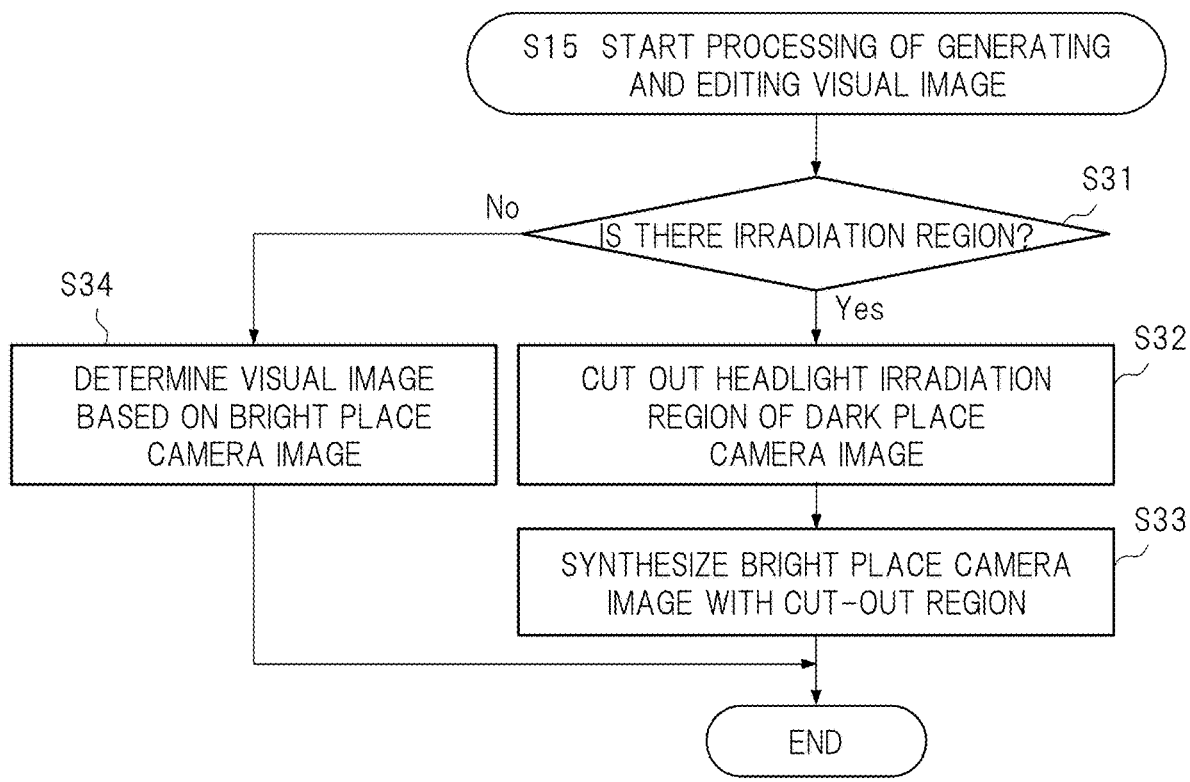
FIG. 18 is a flowchart of generation and editing processing of a visual image according to the fifth embodiment.

FIG. 18 is a flowchart of generation and editing processing of the visual image according to the fifth embodiment. This processing flow is a processing flow corresponding to step S15 in the entire processing flow according to the first embodiment illustrated in FIG. 4, and is a modification from the first embodiment.

In step S31, processing of determining whether there is a spot irradiation region is performed. Specifically, the visual image decider 63 determines whether there is the spot irradiation region in the obtained dark place camera image. In this determination, when it is determined that there is the spot irradiation region (S31, Yes), the flow proceeds to step S32. On the other hand, in this determination, when it is determined that there is no spot irradiation region (S31, No), the flow proceeds to step S34.

In step S32, processing of cutting out an image portion of the spot irradiation region is performed. Specifically, the visual image decider 63 cuts out the image portion of the spot irradiation region irradiated by a light source such as a headlight from the dark place camera image.

In step S33, processing of synthesizing the cut-out image portion is performed. Specifically, the visual image decider 63 decides the visual image by attaching the cut-out image portion to a region corresponding to the spot irradiation region in the image set as the basis of the visual image. At this time, the attached position and the size of the cut-out image portion are adjusted such that the image set as the basis and the cut-out image portion are smoothly connected and appear naturally. Thereafter, the generation and editing processing of the visual image ends, and the flow proceeds to step S16 illustrated in FIG. 4.

In step S34, the visual image is decided by the method according to the first to fourth embodiments described above. Thereafter, the generation and editing processing of the visual image ends, and the flow proceeds to step S16 illustrated in FIG. 4.

Figure 19:
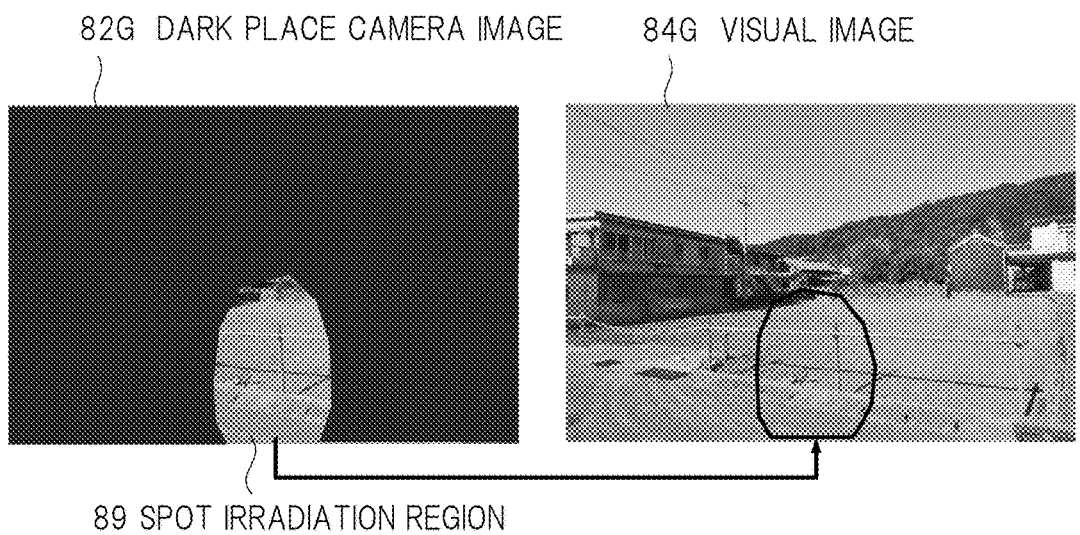
FIG. 19 is a diagram illustrating an example of a camera image and a visual image obtained according to the fifth embodiment.

FIG. 19 is a diagram illustrating an example of a camera image and a visual image obtained according to the fifth embodiment. In FIG. 19, 82G denotes a dark place camera image and 84G denotes a visual image. In the dark place camera image 82G, a situation in front is displayed in a spot irradiation region 89 irradiated by the headlight 22.

The visual image 84G is an image obtained by attaching an image portion of the spot irradiation region 89 in the dark place camera image to a corresponding region of the spot irradiation region 89 in the bright place camera image.

For example, a case in which there is an unknown difference region in the visual image 84G and a mask display is performed in the difference region will be considered. At this time, the user can directly visually confirm what is in the difference region with the camera image by directing the headlight 22 to a real space region corresponding to the mask display region and illuminating the real space region. Although one spot region is attached for display in this example, the user can obtain an image of the irradiation region having a large area by changing the spot irradiation direction to move the irradiation region. It is also possible to attach an image of such a wide spot irradiation region.

According to the fifth embodiment described above, in a case where there is a difference that is not shown in the past bright place camera image in front of the user in a dark place, the difference can be confirmed with the visual image by illuminating the difference region with a light source. This is particularly effective when the display surface of the visual image does not have light transparency as described later.

Sixth Embodiment

A sixth embodiment of the present invention will be described.

The sixth embodiment is an HMD that can be operated by a gesture of a user.

Figure 20A:
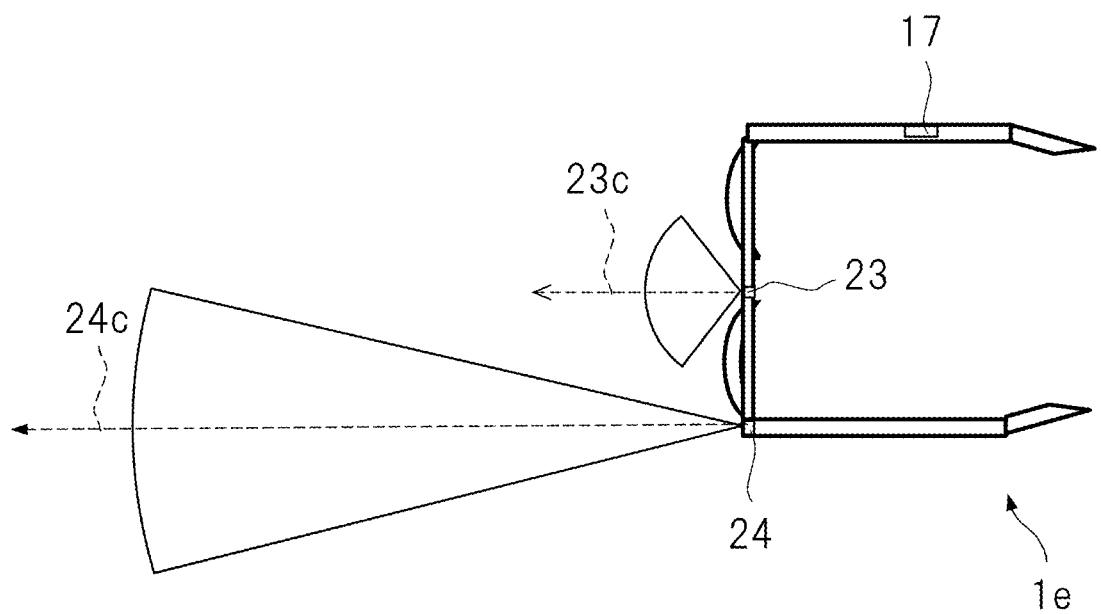
FIG. 20A is a diagram illustrating a first example of an appearance of an HMD according to a sixth embodiment.
Figure 20B:
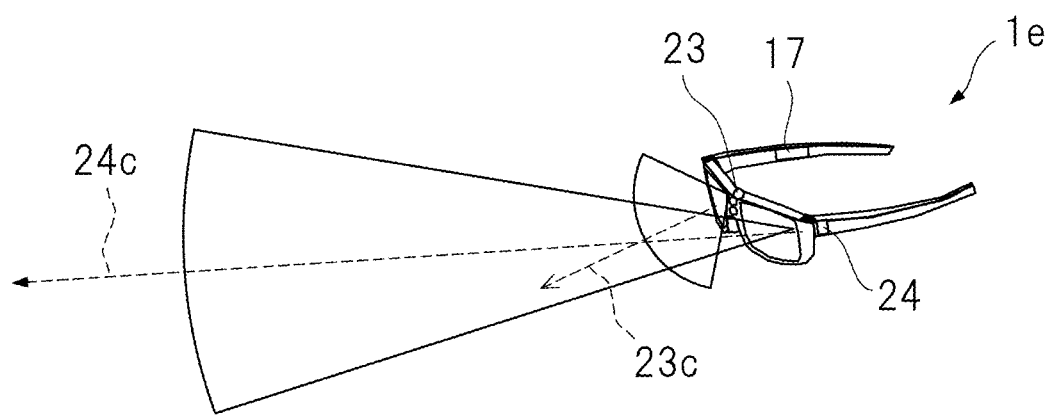
FIG. 20B is a diagram illustrating the first example of the appearance of the HMD according to the sixth embodiment.

FIG. 20A and FIG. 20B are diagrams illustrating a first example of the appearance of the HMD according to the sixth embodiment. An HMD 1e illustrated in FIG. 20A and FIG. 20B includes a distance measurement sensor (hereinafter, referred to as a short distance measurement sensor) 23 suitable for measuring a short distance and a distance measurement sensor (hereinafter, referred to as a medium-to-long distance measurement sensor) 24 suitable for measuring a medium distance or a long distance. These distance measurement sensors are connected to the controller 17, and the controller 17 acquires distance data obtained by these distance measurement sensors.

The medium-to-long distance measurement sensor 24 is configured to obtain distance data with respect to a real space in front of the user's line of sight. The short distance measurement sensor 23 is configured to detect a gesture by a user's finger. In the storage data area in the controller 17, a table in which the distance data and the types of the operation corresponding to the types of the gesture are associated with each other is stored. The controller 17 recognizes the type of the gesture of the user with reference to the table based on the distance data obtained by the short distance measurement sensor 23, and receives an operation corresponding to the type of the gesture. Examples of the operation include turning on/off of the dark place guidance program, switching of the displayed visual image, and the like.

For example, as illustrated in FIG. 20A, the medium-to-long distance measurement sensor 24 is installed at an end portion of an upper frame of lens (display) in the width direction in the HMD 1e. In addition, the short distance measurement sensor 23 is installed at the center of the upper frame. In this case, a distance measurement central axis direction 24c of the medium-to-long distance measurement sensor 24 is substantially the same as a distance measurement central axis direction 23c of the short distance measurement sensor 23. The user performs a gesture operation by putting his or her fingers in front of his or her eyes. The short distance measurement sensor 23 obtains distance data corresponding to the gesture operation of the user.

Meanwhile, in a case where the user looks at a close place in front of the user himself or herself, the line-of-sight direction of the user is often lower than that of a case in which the user visually recognizes an object in front of the user. Furthermore, it is natural for the user to view the finger in a case of performing a gesture with the finger. Therefore, for example, the short distance measurement sensor 23 may be installed such that the distance measurement central axis direction 23c is inclined downward by a predetermined angle (for example, 30°) from the distance measurement central axis direction 24c of the medium-to-long distance measurement sensor 24 as illustrated in FIG. 20B. In this way, the user can perform the gesture operation with his/her finger while confirming the gesture operation in the natural line-of-sight direction, and can perform a more natural and less stressful operation.

Note that the arrangement of the short distance measurement sensor 23 and the medium-to-long distance measurement sensor 24 is not limited to the above example, and can be modified in various ways according to a design concept, specifications, or the like.

Figure 21A:
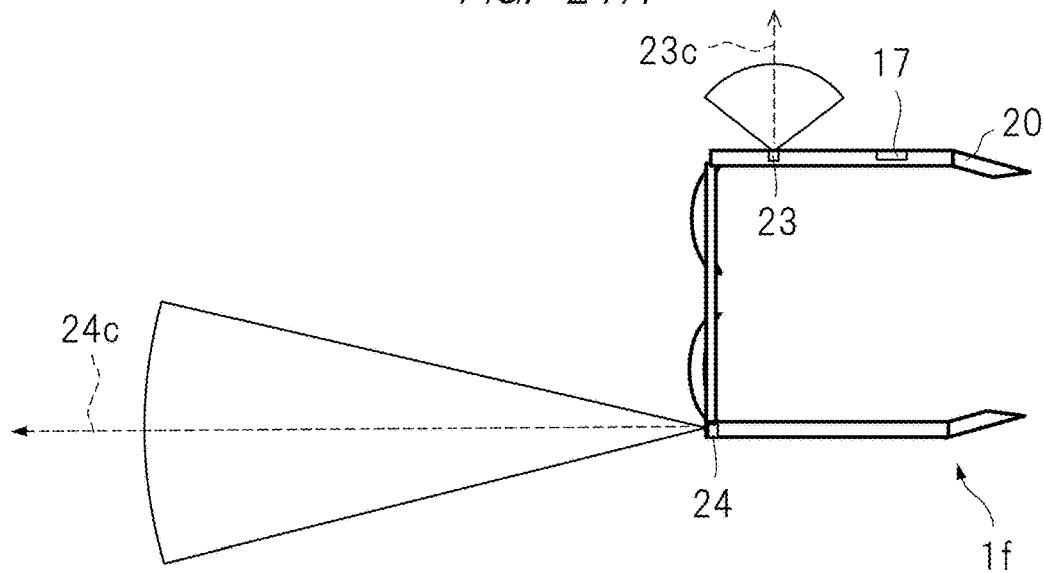
FIG. 21A is a diagram illustrating a second example of the appearance of the HMD according to the sixth embodiment.
Figure 21B:
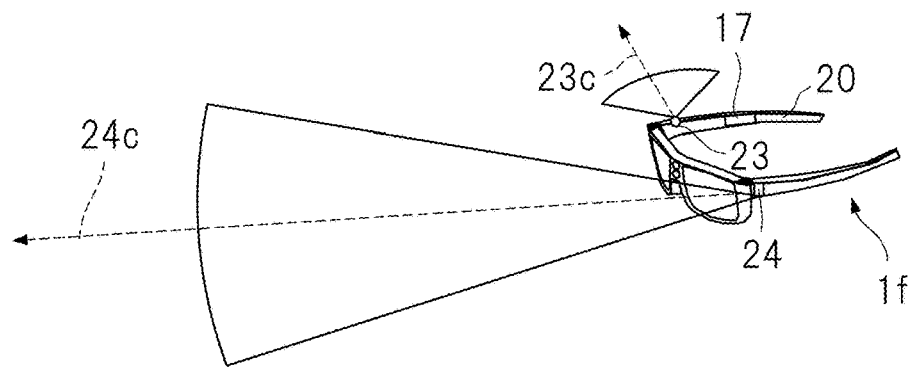
FIG. 21B is a diagram illustrating the second example of the appearance of the HMD according to the sixth embodiment.

FIG. 21A and FIG. 21B are diagrams illustrating a second example of the appearance of the HMD according to the sixth embodiment. Further, FIG. 21C is a diagram illustrating a gesture operation region by the user's finger.

FIG. 21A and FIG. 21B illustrate a modification in which the arrangement of the short distance measurement sensor is changed from the first example above.

An HMD 1f according to the present modification is an example in which the short distance measurement sensor 23 is arranged in a shape portion such as a temple of glasses in a frame housing 20. The distance measurement central axis direction 24c of the medium-to-long distance measurement sensor 24 is the same as that in the previous example, but the distance measurement central axis direction 23c of the short distance measurement sensor 23 is changed to a direction extending laterally from the side surface of the user's head. In this case, the user performs the gesture operation with the fingers around the side surface of the user's head.

Figure 21C:
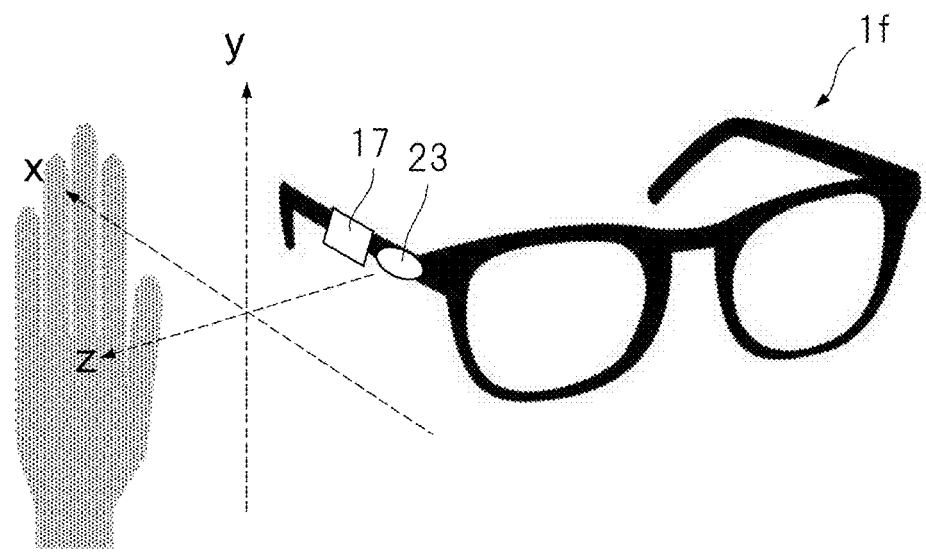
FIG. 21C is a diagram illustrating a gesture operation region by the user's finger.

For example, as illustrated in FIG. 21C, a gesture operation space region is defined by an xyz coordinate system, and the gesture operation space region is segmentalized into a plurality of partial regions. The short distance measurement sensor 23 obtains a distance measurement value in each segmentalized partial region, and the controller 17 detects the gesture operation based on a distribution state of the distance measurement values or a temporal change thereof. Examples of the gesture operation include moving the finger in the x direction allocated to an instruction to move the display screen forward and backward, moving the finger in the y direction allocated to an instruction to move the display screen upward and downward, and moving the finger in the z direction allocated to an instruction to enlarge/reduce the display screen.

In this way, the gesture operation by the user's finger can be performed near the side surface of the head, and the operation can be performed without disturbing the visual field by the gesture.

According to the sixth embodiment described above, the operation of the image display apparatus such as turning on/off of the dark place guidance program, switching of the display image, and the like can be performed by the gesture operation of the user, and a more user-friendly image display apparatus can be realized. For example, even in a case where the user wears gloves to work on site, the user can operate the image display apparatus without operating buttons or touch panels that require a relatively delicate operation.

Seventh Embodiment

A seventh embodiment of the present invention will be described.

The seventh embodiment is an example of an HMD configured to display a user interface screen.

The controller 17 of the HMD controls a display so as to display the user interface screen on the display surface, and receives a predetermined operation such as the gesture operation described in the sixth embodiment.

FIG. 22 is a diagram illustrating an example of the user interface screen in the HMD. For example, when detecting that the field of view of the user becomes dark by an illuminance sensor, the controller 17 of the HMD controls the display to display a switching selection screen 90 of the screen display. For example, a selection screen as illustrated in FIG. 22 is displayed such that the user can select whether to switch the display screen to a bright mode.

In a case where the user does not switch the screen, that is, selects "NO", for example, a distance measurement image is displayed. On the other hand, when the user switches the screen, that is, selects "YES", a selection screen for further selecting some screen display modes is displayed. For example, a selection screen as illustrated in the lower part of FIG. 22 is displayed such that the user can select an image to be displayed from among "daytime image", "partial image interpolation", and "arranged image".

In this way, it is possible to display a bright video (image) obtained by imaging in a bright place, and it is also possible to replace only a dark portion with the image obtained by imaging in a bright state in a case where a part of the visual field is dark. Furthermore, the processed image may be displayed through image processing by selecting an arranged image. For example, an image intentionally converted into black and white or sepia color may be displayed, or an image arranged in a gorgeously brilliant color used in CG or animation may be displayed.

According to the seventh embodiment described above, the image can be switched according to the user's intention or preference.

Eighth Embodiment

An eighth embodiment of the present invention will be described.

The first to seventh embodiments are examples in which the HMD including the image display surface with light transparency through which light from the front of the user passes is used as the image display apparatus. The present embodiment is an example in which the HMD including the image display surface having no light transparency through which light from the front of the user does not pass is used as the image display apparatus.

Figure 23:
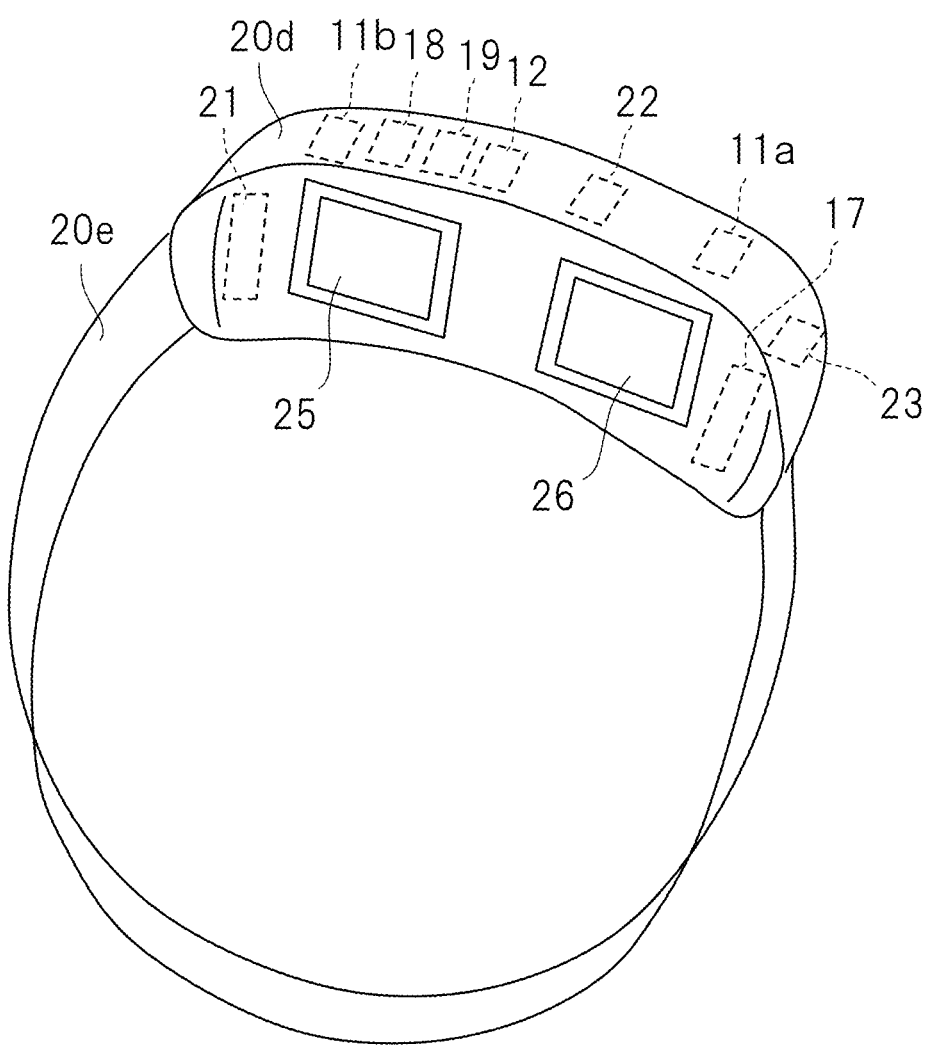
FIG. 23 is an external view of an HMD according to an eighth embodiment.

FIG. 23 is an external view of an HMD according to the eighth embodiment corresponding to the image display apparatus according each of the first to seventh embodiments. FIG. 23 is a diagram illustrating an example of a goggle-type HMD including a display surface having no light transparency with respect to light from the front of the user. This way of use is the so-called video see-through mode in which images captured by a camera are displayed on the left and right displays. An HMD 1z illustrated in FIG. 23 includes a housing 20d shaped so as to cover the visual field of the user and a fixture 20e for fixing the housing 20d so as to cover the visual field of the user. A left-eye display 25 and a right-eye display 26 are provided on a surface of the housing 20d that covers the user's eyes. In addition, the housing 20d is mounted with a right camera 11a, a left camera 11b, a distance measurement sensor 12, a controller 17, a microphone 18, a speaker 19, a battery 21, a headlight 22, and a short distance measurement sensor 23. An illuminance sensor is built in the controller 17, but may be provided in an upper portion of the housing 20d.

The left-eye display 25 and the right-eye display 26 are each composed of, for example, a liquid crystal panel, an organic electro luminescence (EL) panel, a plasma display, or the like. Of course, each of the left-eye display 25 and the right-eye display 26 may be composed of an image projection device using a projector.

A user wears the HMD 1z on the head, views the image displayed on the left-eye display with the left eye, and views the image displayed on the right-eye display with the right eye, so that the user can stereoscopically view a camera image, a distance image, a visual image, or the like in front.

According to the eighth embodiment described above, it is possible to use a more robust HMD in close contact with the face as the image display apparatus, so that it is possible to protect the user's eyes from a dangerous obstacle, gas, or liquid that may exist at the site. In addition, since it is not necessary to limit the display to the projector type, a degree of freedom in design for the image display apparatus increases.

Ninth Embodiment

A ninth embodiment of the present invention will be described.

The first to eighth embodiments are examples in which the HMD is used as the image display apparatus. The ninth embodiment is an example in which a portable information terminal is used as the image display apparatus. Examples of the portable information terminal include a smartphone, a tablet terminal device, a notebook computer, and the like.

Among the portable information terminals, there are many models in which a camera and a distance measurement sensor are mounted on a side (back side) opposite to a side on which a display screen is installed. The distance measurement sensor of a retrofitting type may be installed. Such a portable information terminal can perform the same operation as that of the HMD described above.

Figure 24A:
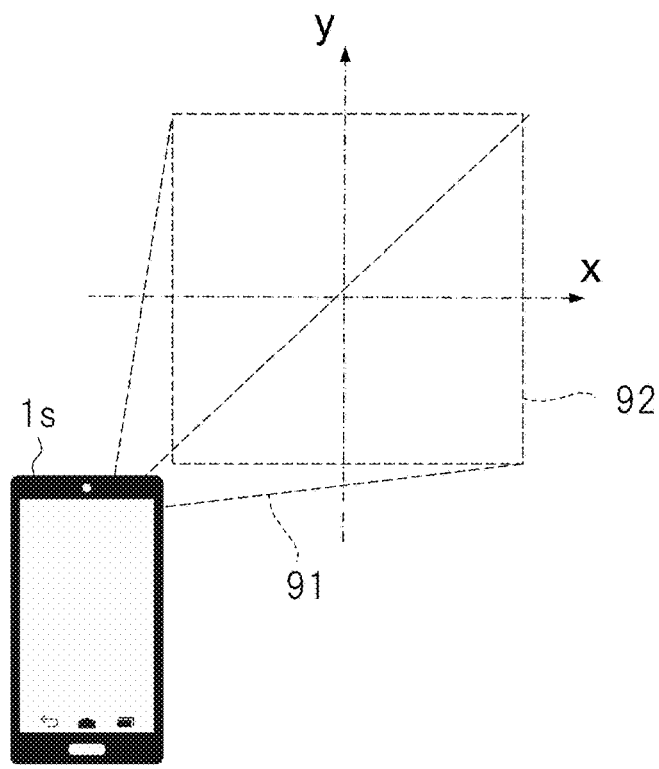
FIG. 24A is a diagram illustrating an example of an angle of view of a camera and a measurement range of a distance measurement sensor in a portable information terminal.
Figure 24B:
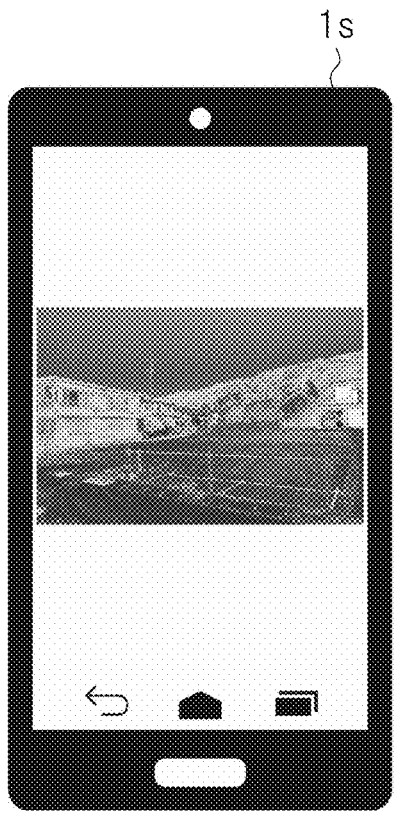
FIG. 24B is a diagram illustrating an example of a state in which a dark place distance image is displayed on the portable information terminal.
Figure 24C:
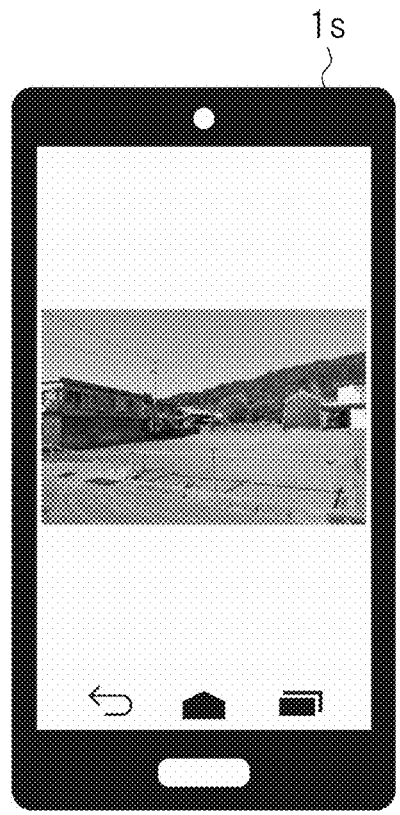
FIG. 24C is a diagram illustrating an example of a state in which a bright place camera image is displayed on the portable information terminal.

FIG. 24A is a diagram illustrating an example of an angle of view of the camera and a measurement range of the distance measurement sensor in the portable information terminal. FIG. 24B is a diagram illustrating an example of a state in which a dark place distance image is displayed on the portable information terminal. Further, FIG. 24C is a diagram illustrating an example of a state in which a bright place camera image is displayed on the portable information terminal.

For example, a portable information terminal 1s is configured such that xy coordinate axes indicated by dash-dotted lines in FIG. 24A are defined and an angle of view 91 of the camera and a measurement range 92 of the distance measurement sensor indicated by dashed lines are provided. Furthermore, for example, the portable information terminal 1s can display a dark place distance image on a display screen as illustrated in FIG. 24B and can display a bright place camera image corresponding to the dark place distance image as illustrated in FIG. 24C.

According to the ninth embodiment described above, it is possible to perform an operation similar to those of the HMDs according to the first to eighth embodiments with the highly versatile and widely prevailing portable information terminal without using a specially fabricated image display apparatus such as the HMD. Accordingly, the development cost of the image display apparatus or the cost of the apparatus itself can be reduced. In addition, it is possible to expand the users to those who already own the portable information terminal, and it is possible to efficiently accumulate the image sets in any place. Further, the users can also obtain visual images such as the bright place camera image at any place.

In the foregoing, various embodiments of the present invention have been described above, but the present invention is not limited to the above-described embodiments and includes various modifications. For example, a similar effect can be obtained even when the generation of a distance image by a distance sensor is replaced with the generation of an infrared camera image by an infrared camera. In addition, the embodiments above have been described in detail so as to make the present invention easily understood, and the present invention is not necessarily limited to that including all the configurations described above. Also, part of the configuration of one embodiment may be replaced with the configuration of another embodiment, and the configuration of one embodiment may be added to the configuration of another embodiment. These configurations are all within the scope of the present invention. Furthermore, numerical values, messages, and the like included in the specification and the drawing are merely examples, and the effects of the present invention are not impaired even if different ones are used.

In addition, another configuration may be added to part of the configuration of each embodiment, and part of the configuration of each embodiment may be eliminated or replaced with another configuration. Also, some or all of the above-described configurations, functions, processing units, processing means, and the like may be implemented by hardware, for example, by designing with integrated circuits. In addition, each of the above-described configurations, functions, and the like may be implemented by software by allowing a processor such as an MPU or a CPU to interpret and execute a program for implementing each function. In addition, the range of functions implemented by software is not limited, and hardware and software may be used in combination. Information such as a program, a table, and a file for implementing each function can be stored in a storage such as a memory, a hard disk, and a solid state drive (SSD), or a recording medium such as an IC card, an SD card, and a DVD.

Hereinafter, possible aspects of the present invention will be additionally described.

Supplementary Note 1

An image display apparatus configured to display a visual image to be visually recognized by a user, the image display apparatus including:
a camera configured to capture an image in front of the user to obtain a camera image;
a distance measurement sensor configured to obtain data representing a distance from the user to each position in a real object included in a visual field region of the camera;
an illuminance sensor configured to obtain data representing brightness of a place in which the user is present;
a generator configured to generate a distance image which corresponds to the visual field region and in which each pixel represents a distance to each of the positions based on the data obtained by the distance measurement sensor;
a determinator configured to determine whether the place in which the user is present is a bright place or a dark place based on the data obtained by the illuminance sensor;
a storage configured to store the camera image obtained by the camera and the distance image obtained by the generator as an image set including a bright place camera image and a bright place distance image when the determinator determines that the place in which the user is present is the bright place;
a recognizer configured to recognize the distance image obtained by the generator as a dark place distance image when the determinator determines that the place in which the user is present is the dark place;
a retriever configured to specify a bright place distance image corresponding to the recognized dark place distance image by comparing the bright place distance image stored in the storage with the dark place distance image recognized by the recognizer;
a decider configured to decide the visual image to be visually recognized by the user based on the bright place camera image included in the same image set as the bright place distance image specified by the retriever; and a display configured to display the visual image.

Supplementary Note 2

A program for causing a computer to function as the generator, the determinator, the storage, the recognizer, the retriever, and the decider in the image display apparatus according to [supplementary note 1].

Supplementary Note 3

A computer-readable recording medium in which a program for causing a computer to function as the generator, the determinator, the storage, the recognizer, the retriever, and the decider in the image display apparatus according to [supplementary note 1] is stored.

Supplementary Note 4

The image display apparatus according to supplementary note 1,
wherein, in the processing of comparing the dark place distance image with the bright place distance image, at least one of parallel movement, rotation movement, and enlargement/reduction is applied to at least one of the dark place distance image and the bright place distance image.

Supplementary Note 5

The image display apparatus according to supplementary note 1,
wherein a smartphone, a tablet terminal device, or a notebook computer is used as the image display apparatus.

Supplementary Note 6

The image display apparatus according to supplementary note 1,
wherein the camera serves also as the illuminance sensor.

Supplementary Note 7

The image display apparatus according to supplementary note 1,
wherein the retriever performs the comparison while performing at least one of parallel movement, rotation movement, and enlargement/reduction on at least one of the recognized dark place distance image and the specified bright place distance image.

Supplementary Note 8

The image display apparatus according to supplementary note 1,
wherein the display includes a screen on which the visual image is projected.

Supplementary Note 9

The image display apparatus according to supplementary note 1,
wherein the display includes a display device configured to display the visual image.

Supplementary Note 10

The image display apparatus according to supplementary note 1,
wherein the retriever specifies a bright place distance image whose similarity degree or matching degree with the dark place distance image is equal to or greater than a threshold as the bright place distance image corresponding to the dark place distance image.

Supplementary Note 11

The image display apparatus according to supplementary note 1, wherein the retriever specifies a bright place distance image, which is recognized by artificial intelligence as being matching, approximating, or similar to the dark place distance image, as the bright place distance image corresponding to the dark place distance image.

Supplementary Note 12

The image display apparatus according to supplementary note 1, including a time information receiver,
wherein the time information receiver acquires time information including at least a date, and
wherein the storage executes:
processing of extracting, from among the stored bright images, bright place distance a place distance image corresponding to the bright place distance image to be stored in the storage;
processing of storing the image set in association with the time information acquired by the time information receiver when storing the image set; and
processing of overwriting the image set including the bright place distance image extracted by the extraction processing when storing the image set or processing of erasing the image set including the extracted bright place distance image when time indicated by the time information associated with the extracted bright place distance image is earlier than time indicated by the time information associated with the bright place distance image to be stored by a first time or more.

Supplementary Note 13

The image display apparatus according to supplementary note 12,
wherein the extraction processing is processing of extracting a bright place distance image whose similarity degree or matching degree with the bright place distance image to be stored is equal to or greater than a threshold as the bright place distance image corresponding to the bright place distance image to be stored.

Supplementary Note 14

The image display apparatus according to supplementary note 12,
wherein the extraction processing is processing of extracting a bright place distance image, which is recognized by artificial intelligence as being matching, approximating, or similar to the bright place distance image to be stored, as the bright place distance image corresponding to the bright place distance image to be stored.

REFERENCE SIGNS LIST 1, 1a, 1b, 1h TRANSMISSIVE HEAD MOUNTED DISPLAY
1z NON-TRANSMISSIVE HEAD MOUNTED DISPLAY
1s PORTABLE INFORMATION TERMINAL
11 CAMERA
12 DISTANCE MEASUREMENT SENSOR
13 RIGHT-EYE PROJECTOR
14 LEFT-EYE PROJECTOR
15 IMAGE SCREEN
16 NOSE PAD
17 CONTROLLER
18 MICROPHONE
19 SPEAKER
20, 20a to 20c FRAME HOUSING
21 BATTERY
22 HEADLIGHT
23 SHORT DISTANCE MEASUREMENT SENSOR
24 MEDIUM-TO-LONG DISTANCE MEASUREMENT SENSOR
30 INTERNAL BUS
31 GPS SENSOR
32 ILLUMINANCE SENSOR
33 ACCELERATION SENSOR
34 GYRO SENSOR
35 ORIENTATION SENSOR
36 PROCESSOR
37 MEMORY
38 IMAGE MEMORY
39 NON-VOLATILE STORAGE
40 TRANSCEIVER
41 BASIC OPERATION PROGRAM
42 DARK PLACE GUIDANCE PROGRAM
43 STORAGE DATA AREA
51 POSITION INFORMATION RECEIVER
52 TIME INFORMATION RECEIVER
53 ORIENTATION INFORMATION RECEIVER
54 POSTURE INFORMATION RECEIVER
55 CAMERA IMAGE RECEIVER
56 DISTANCE IMAGE GENERATOR
57 BRIGHT/DARK PLACE DETERMINATOR
58 BRIGHT PLACE IMAGE STORAGE MANAGER
59 BRIGHT PLACE IMAGE STORAGE
60 DARK PLACE DISTANCE IMAGE RECOGNIZER
61 COMPARISON IMAGE NARROWING-DOWN DEVICE
62 BRIGHT PLACE IMAGE RETRIEVER
63 VISUAL IMAGE DECIDER
64 VISUAL IMAGE DISPLAY
65 DIFFERENCE REGION DETECTOR
66 DIFFERENCE FACTOR DISCRIMINATOR
67 BRIGHT PLACE DISTANCE IMAGE SELECTOR
68 IRRADIATION REGION DETECTOR
70 USER
72 ACCESS POINT
73 NETWORK
74 IMAGE STORAGE SERVICE SERVER
100, 101 HMD SYSTEM

The invention claimed is:
1. An image display apparatus configured to display a visual image to be visually recognized by a user, the image display apparatus comprising:
a camera configured to capture an image in front of the user to obtain a camera image;
a distance measurement sensor configured to obtain data representing a distance from the user to each position in a real object included in a visual field region of the camera;
an illuminance sensor configured to obtain data representing brightness of a place in which the user is present;
a generator configured to generate a distance image which corresponds to the visual field region and in which each pixel represents a distance to each of the positions based on the data obtained by the distance measurement sensor;

a determinator configured to determine whether the place in which the user is present is a bright place or a dark place based on the data obtained by the illuminance sensor;

a storage configured to store the camera image obtained by the camera and the distance image obtained by the generator as an image set including a bright place camera image and a bright place distance image when the determinator determines that the place in which the user is present is the bright place;

a recognizer configured to recognize the distance image obtained by the generator as a dark place distance image when the determinator determines that the place in which the user is present is the dark place;

a retriever configured to specify a bright place distance image corresponding to the recognized dark place distance image by comparing the bright place distance image stored in the storage with the dark place distance image recognized by the recognizer;

a decider configured to decide the visual image to be visually recognized by the user based on the bright place camera image included in the same image set as the bright place distance image specified by the retriever; and a display configured to display the visual image.

2. The image display apparatus according to claim 1, comprising:
a position information receiver; and
a narrowing-down device,
wherein the position information receiver acquires position information of the user,
wherein the storage stores the image set and the position information acquired by the position information receiver in association with each other when storing the image set, and
wherein the narrowing-down device narrows down the bright place distance images to be compared by the retriever based on the position information associated with the image set.

3. The image display apparatus according to claim 1, comprising a time information receiver,
wherein the time information receiver acquires time information including at least a date, and
wherein the storage executes:
extraction processing of extracting, from among the stored bright place distance images, a bright place distance image corresponding to the bright place distance image to be stored;
storage processing of storing the image set in association with the time information acquired by the time information receiver when storing the image set; and
overwriting processing of overwriting the image set including the bright place distance image extracted by the extraction processing when storing the image set or erasing processing of erasing the image set including the extracted bright place distance image when time indicated by the time information associated with the extracted bright place distance image is earlier than time indicated by the time information associated with the bright place distance image to be stored by a first time or more.

4. The image display apparatus according to claim 1, comprising a detector,
wherein the detector detects a difference region between the recognized dark place distance image and the specified bright place distance image, and wherein the decider decides the visual image by executing insertion processing of inserting a corresponding image of the difference region in the recognized dark place distance image into a corresponding region of the difference region in the bright place camera image included in the same image set as the specified bright place distance image.

5. The image display apparatus according to claim 4, comprising a discriminator,
wherein the discriminator discriminates which one of the recognized dark place distance image and the specified bright place distance image includes a generation factor of the difference region, and
wherein the decider executes the insertion processing when the discriminator determines that the specified bright place distance image includes the generation factor.

6. The image display apparatus according to claim 1, comprising:
a detector; and
a selector,
wherein the detector detects a difference region between the recognized dark place distance image and the specified bright place distance image,
wherein the selector selects a bright place distance image, which corresponds to the recognized dark place distance image and is different from the specified bright place distance image, by comparing the bright place distance image stored in the storage with the recognized dark place distance image, and
wherein the decider decides the visual image by executing insertion processing of inserting a corresponding image of the detected difference region in the bright place camera image included in the same image set as the bright place distance image selected by the selector into a corresponding region of the detected difference region in the bright place camera image included in the same image set as the specified bright place distance image.

7. The image display apparatus according to claim 1, comprising:
a detector; and
a discriminator,
wherein the detector detects a difference region between the recognized dark place distance image and the specified bright place distance image,
wherein the discriminator discriminates which one of the recognized dark place distance image and the specified bright place distance image includes a generation factor of the difference region detected by the detector, and
wherein the decider decides the visual image by executing emphasis processing of emphasizing a corresponding region of the detected difference region in the bright place camera image included in the same image set as the specified bright place distance image when the discriminator discriminates that the recognized dark place distance image includes the generation factor.

8. The image display apparatus according to claim 1, comprising:
a detector; and
a discriminator,
wherein the detector detects a difference region between the recognized dark place distance image and the specified bright place distance image,
wherein the discriminator discriminates which one of the recognized dark place distance image and the specified bright place distance image includes a generation factor of the difference region detected by the detector, and wherein the decider decides the visual image by executing insertion processing of inserting an artificial image according to a feature of the difference region into a corresponding region of the detected difference region in the bright place camera image included in the same image set as the specified bright place distance image when the discriminator discriminates that the recognized dark place distance image includes the generation factor.

9. The image display apparatus according to claim 1, wherein the retriever specifies a plurality of the bright place distance images, and wherein the decider decides the visual image based on the plurality of bright place distance images specified by the retriever.

10. The image display apparatus according to claim 1, comprising:

a light source; and a detector, wherein the light source illuminates a part of the visual field region, wherein the detector detects an irradiation region of the light source in a dark place camera image obtained by the camera in a dark place, and wherein the decider decides the visual image by executing insertion processing of inserting a corresponding image of the detected irradiation region in the dark place camera image included in the same image set as the recognized dark place distance image into a corresponding region of the irradiation region detected by the detector in the bright place camera image included in the same image set as the specified bright place distance image.

11. The image display apparatus according to claim 1, comprising a head mounted display, wherein the head mounted display includes the camera, the distance measurement sensor, the illuminance sensor, and the display.

12. An image display system comprising:

a server connected to a network; and a portable image display apparatus connected to the network and configured to communicate with the server, wherein the image display apparatus includes:

a camera configured to capture an image in front of a user to obtain a camera image;

a distance measurement sensor configured to obtain data representing a distance from the user to each position in a real object included in a visual field region of the camera;

an illuminance sensor configured to obtain data representing brightness of a place in which the user is present; and a display configured to display a visual image to be visually recognized by the user, and wherein, based on cooperation between the server and the image display apparatus, the image display system executes:

generation processing of generating a distance image which corresponds to the visual field region and in which each pixel represents a distance to each of the positions based on the data obtained by the distance measurement sensor;

determination processing of determining whether the place in which the user is present is a bright place or a dark place based on the data obtained by the illuminance sensor;

storage processing of storing the camera image obtained by the camera and the distance image obtained by the generation processing as an image set including a bright place camera image and a bright place distance image when the place in which the user is present is determined as the bright place by the determination processing;

recognition processing of recognizing the distance image obtained by the generation processing as a dark place distance image when the place in which the user is present is determined as the dark place by the determination processing;

retrieval processing of specifying a bright place distance image corresponding to the recognized dark place distance image by comparing the bright place distance image stored by the storage processing with the dark place distance image recognized by the recognition processing; and decision processing of deciding the visual image based on the bright place camera image included in the same image set as the bright place distance image specified by the retrieval processing.

13. An image display system comprising:

a server connected to a network; and a plurality of portable image display apparatuses connected to the network and configured to communicate with the server, wherein each of the plurality of image display apparatuses includes:

a camera configured to capture an image in front of a user to obtain a camera image;

a distance measurement sensor configured to obtain data representing a distance from the user to each position in a real object included in a visual field region of the camera;

an illuminance sensor configured to obtain data representing brightness of a place in which the user is present;

a display configured to display a visual image to be visually recognized by the user; and a position information receiver configured to acquire position information of the user, wherein, based on cooperation between the server and each of the plurality of image display apparatuses, the image display system executes:

first generation processing of generating a distance image which corresponds to the visual field region and in which each pixel represents a distance to each of the positions based on the data obtained by the distance measurement sensor;

first determination processing of determining whether the place in which the user is present is a bright place or a dark place based on the data obtained by the illuminance sensor; and storage processing of storing, as an image set including a bright place camera image and a bright place distance image, a camera image obtained by the camera and the distance image obtained by the first generation processing in the server in association with the image set and the position information acquired by the position information receiver, when the place is determined as the bright place by the first determination processing, and wherein, based on cooperation between the server and one image display apparatus of the plurality of image display apparatuses, the image display system executes:

second generation processing of generating a distance image which corresponds to the visual field region and represents a distance to each of the positions based on the data obtained by the distance measurement sensor;

second determination processing of determining whether the place in which the user is present is a bright place or a dark place based on the data obtained by the illuminance sensor;

recognition processing of recognizing the distance image obtained by the second generation processing as a dark place distance image when the place in which the user is present is determined as the dark place by the second determination processing;

identification processing of identifying a bright place distance image, the position of which indicated by associated position information corresponds to a position indicated by the position information acquired by the position information receiver of the one image display apparatus, from among bright place distance images stored in the server;

retrieval processing of specifying the bright place distance image corresponding to the recognized dark place distance image by comparing the bright place distance image identified by the identification processing with the dark place distance image recognized by the recognition processing; and decision processing of reading the bright place camera image included in the same image set as the bright place distance image specified by the retrieval processing from the server and deciding the visual image to be displayed by the one image display apparatus based on the read bright place camera image.

14. The image display system according to claim 12,
wherein the image display apparatus has a shape of a head mounted display, and
wherein the display includes an image display surface that covers a part or all of a visual field of the user and has transparency with respect to light from a front of the user.

15. The image display system according to claim 12,
wherein the image display apparatus has a shape of a head mounted display, and
wherein the display includes an image display surface that covers a part or all of a visual field of the user and does not have transparency with respect to light from a front of the user.

16. A portable image display apparatus configured to communicate with a server connected to a network, the image display apparatus comprising:

a camera configured to capture an image in front of a user to obtain a camera image;

a distance measurement sensor configured to obtain data representing a distance from the user to each position in a real object included in a visual field region of the camera;

an illuminance sensor configured to obtain data representing brightness of a place in which the user is present; and a display configured to display a visual image to be visually recognized by the user, wherein the image display apparatus further comprises:

a generator configured to generate a distance image which corresponds to the visual field region and in which each pixel represents a distance to each of the positions based on the data obtained by the distance measurement sensor;

a determinator configured to determine whether the place in which the user is present is a bright place or a dark place based on the data obtained by the illuminance sensor;

a transceiver configured to output the camera image obtained by the camera and the distance image obtained by the generator so as to be stored in the server as an image set including a bright place camera image and a bright place distance image when the place in which the user is present is determined as the bright place by the determinator; and recognizer configured to recognize the distance image obtained by the generator as a dark place distance image when the place in which the user is present is determined as the dark place by the determinator, wherein, based on cooperation between the server and the image display apparatus, the image display apparatus specifies a bright place distance image corresponding to the recognized dark place distance image by comparing the bright place distance image stored in the server with the dark place distance image recognized by the recognizer, receives, by the transceiver, the visual image processed based on the bright place camera image included in the same image set as the specified bright place distance image, and displays the received visual image.

* * * * *